US012378105B1

(12) United States Patent
Boucher

(10) Patent No.: US 12,378,105 B1
(45) Date of Patent: Aug. 5, 2025

(54) BEER BOTTLING FLOW CONTROL APPARATUS

(71) Applicant: Pierre Vincent Boucher, Georgetown (GY)

(72) Inventor: Pierre Vincent Boucher, Georgetown (GY)

( * ) Notice: Subject to any disclaimer, the term of this patent is extended or adjusted under 35 U.S.C. 154(b) by 0 days.

(21) Appl. No.: 19/202,782

(22) Filed: May 8, 2025

(51) Int. Cl.
*B67C 3/26* (2006.01)

(52) U.S. Cl.
CPC .................................... *B67C 3/26* (2013.01)

(58) Field of Classification Search
CPC .... B67C 3/02; B67C 3/22; B67C 3/26; B67C 3/2617; B67C 3/28; B67C 2003/228
See application file for complete search history.

(56) References Cited

U.S. PATENT DOCUMENTS 1,477,485 A * 12/1923 Haskell ..................... B67C 7/00 53/274
1,561,868 A * 11/1925 Larsen .................. B67C 7/0093 53/283
3,589,410 A * 6/1971 Manas .................. B67C 7/0046 141/144
3,918,475 A * 11/1975 Trusselle .................. B67C 3/26 141/128
4,544,005 A * 10/1985 Meissner ................ B65B 57/04 141/94
4,722,372 A * 2/1988 Hoffman .............. A47K 5/1214 250/221
2014/0215965 A1* 8/2014 Clusserath ................ B65B 3/18 53/167
2023/0272863 A1* 8/2023 Gloor ...................... F01L 1/047 137/636.1

* cited by examiner

*Primary Examiner* — Nicolas A Arnett
(74) *Attorney, Agent, or Firm* — The Concept Law Group, PA; Scott A. Smiley; Scott M. Garrett

(57) ABSTRACT

A bottling apparatus includes a valve block having several valves that are configured to selectively open or close a respective tubing line of several tubing lines that pass through the valve block. The valves are each individually controlled by a respective cam wheel that are all rotatable about a common axis that is in line with the valves. Each valve is at a valve position relative to the cam wheel. Each cam wheel includes a cam about its circumference that has one or more reliefs in the cam. The cams maintain their respective valves closed as they rotate, until the relief is rotated into alignment with the valve position, which allows the valve to open. The cam wheels are rotated in a forward direction during a bottling process through a sequence of rotational positions that each correspond to one step of the bottling process. To clean the valves, the cam wheels are rotated in a reverse direction, wherein one or more of the cam wheels do not rotate for one or more rotational positions, allow reliefs on all of the cam wheels to line up in the valve block to simultaneously open all of the valves.

16 Claims, 17 Drawing Sheets

500

1302

1300

102

BEER BOTTLING FLOW CONTROL APPARATUS

FIELD OF THE INVENTION

The present invention relates generally to beverage bottling, and, more particularly, relates to a beer bottling flow control apparatus that controls the flow of fluids and gases in and out of a bottle during a bottling operation.

BACKGROUND OF THE INVENTION

Bottling is the process of filling beverage containers (e.g. bottles) with a fluid that is to be later consumed (drank) from the container. Beer is a popular beverage, and often bottled in small "micro" breweries, and even at home by many people. There is a particular process that is followed during bottling to ensure the beer is not subject to oxygen. Since oxygen exposure is detrimental to the storage of beer, the bottling process includes a purge step where oxygen is displaced from the container (bottle) using carbon dioxide. In order to control the generation of foam the bottle must be filled under pressure (counter-pressure), and doing this manually is quite difficult. A bottling apparatus with controllable valves is far more efficient, but also requires cleaning. A system using, for example, solenoid valves would be prohibitively difficult to maintain and clean for a small bottling operation.

Therefore, a need exists to overcome the problems with the prior art as discussed above.

SUMMARY OF THE INVENTION

In accordance with some embodiments of the inventive disclosure, there is provided a bottling flow control apparatus that includes a valve block having a plurality of valves. Each valve of the plurality of valves is configured to selectively close and open a respective tubing line of a plurality of tubing lines through the valve block. There is a plurality of cam wheels, where each cam wheel is aligned with a respective one valve of the plurality of valves. Each cam wheel of the plurality of cam wheels has a circumferential cam that includes at least one relief. The circumferential cam is otherwise circular around a common axle on which the cam wheel is mounted. The plurality of cam wheels are rotatable about the common axle, or equivalently, on the common axle and about an axis of the common axle. The common axle is aligned with the plurality of valves, such that the valves are oriented in a line parallel to the axle. When each cam wheel is rotated about the common axis, the circumferential cam of each cam wheel maintains the respective valve aligned with each cam wheel closed until the at least one relief of the cam wheel is rotated into the valve block. The plurality of cam wheels are rotated in a forward direction through a series of rotational positions. Each one of the rotational positions corresponds to a sequential step of a plurality of sequential steps of a bottling process in which different ones of the plurality of valves are selectively opened for each sequential step of the bottling process. When being rotated in the forward direction during the bottling process all of the cam wheels rotate in unison, meaning they rotate together as if they were one integral cam unit. When the common axle is rotated in a reverse direction, at least one of the plurality of cam wheels does not rotate for at least one rotational position while the other cam wheel are rotated with, or about, the axle. After the common axle is rotated in the reverse direction at least one rotational position, reliefs of each cam wheel will be aligned to produce a plurality of aligned reliefs, and the plurality of cam wheels will then rotate, in the reverse direction, in unison, such that when the plurality of aligned reliefs are rotated into the valve block all of valves of the plurality of valve are opened simultaneously.

In accordance with a further feature, the plurality of cam wheels are driven by a stepper motor that is operable to rotate the plurality of cam wheels in increments of rotation equal to the rotational positions.

In accordance with a further feature, each cam wheel of the plurality of cam wheels includes a hub having a cavity in which a drive member is disposed to impart rotation to the cam wheel.

In accordance with a further feature, the at least one of the plurality of cam wheels that does not rotate for at least one rotational position when the common axle is rotated in the reverse direction comprises a cavity in its hub that has an arc width of at least one rotational position to allow a drive pin attached to the axle to move the at least one rotational position before imparting rotational force to the cam wheel when rotation of the axle is reversed.

In accordance with a further feature, each valve of the plurality of valves comprises a valve shaft, wherein the circumferential cam of the respective cam wheel corresponding to each valve bears a distal end of the valve shaft.

In accordance with a further feature, the plurality of tubing lines comprises five tubing lines for, respectively, a carbon dioxide tubing line, a fluid content tubing line, a suction tubing line, a pressurized fill tubing line, and a depressurization tubing line.

In accordance with some embodiments of the inventive disclosure, there is provided a cam wheel assembly for actuating valves of a bottling flow control apparatus. The cam wheel assembly includes a plurality of cam wheels arranged on a common axle. The plurality of cam wheels are rotated in unison about the common axle in a forward direction through a series of rotational positions which correspond to an equal number of steps of a bottling process. Each cam wheel of the plurality of cam wheels includes a circumferential cam that has at least one relief. Each cam wheel also has a hub in which there is a cavity configured to receive a drive member that imparts rotational force to the cam wheel by bearing against a side of cavity in a direction of rotation. In at least one cam wheel of the plurality of cam wheels the cavity of the at least one cam wheel has an arc width that is equal to at least one rotational position which allows the respective drive member disposed in the cavity to move the at least one rotational position when rotational direction of the common axle is reversed before again imparting rotational force to the at least one cam wheel. When the axle is rotated in a reverse direction the at least one cam wheel in which the cavity has an arc width that is equal to at least one rotational position does not rotate for at least one rotational position. The at least one relief of each cam wheel then align on a common rotational position thereby enabling all of the valves to open together.

In accordance with a further feature, the cam wheel assembly includes a first cam wheel for actuating a valve for a carbon dioxide tubing line, a second cam wheel for actuating a valve for a fluid content tubing line, a third cam wheel for actuating a valve for a suction tubing line, a fourth cam wheel for actuating a valve for a pressurized fill tubing line, and a fifth cam wheel for actuating a valve for a depressurization tubing line.

In accordance with a further feature, the at least one relief of the circumferential cam of the first cam wheel comprises a first relief for a purge step of the bottling process in which carbon dioxide is used to purge air from a bottle, and a second relief for a pressurization step of the bottling process in which the bottle is pressurized with carbon dioxide; the at least one relief of the circumferential cam of the second cam wheel comprises a first relief for a fill step of the bottling process in which the bottle is filled; the at least one relief of the circumferential cam of the third cam wheel comprises a relief for a removal step of the bottling process in which the bottle is removed from the bottling flow control apparatus; the at least one relief of the circumferential cam of the fourth cam wheel comprises a relief for the fill step of the bottling process to allow carbon dioxide to leave the bottle under pressure as the bottle is filled with fluid content; and the at least one relief of the circumferential cam of the fifth cam wheel comprises a first relief for the purge step and a second relief for a depressurization step of the bottling process.

In accordance with a further feature, in at least one cam wheel of the plurality of cam wheels, the cavity is sized to fit the drive member such that the at least one cam wheel is locked to the common axle and always rotates with the common axle regardless of rotational direction.

In accordance with a further feature, wherein the drive member in each cam wheel extends from the common axle.

In accordance with a further feature, the circumferential cam of at least one cam wheel of the plurality of cam wheels comprises at least two reliefs.

In accordance with some embodiments of the inventive disclosure, there is provided a method of operating a cam wheel assembly of a bottling flow control apparatus in which each cam wheel selectively opens a respective valve of a plurality of valves in a valve block, a plurality of cam wheels being provided on a common axle. The method includes rotating the plurality of cam wheels about the common axle in a forward direction, during a bottling process, through consecutive rotational positions, where each rotational position corresponds to a sequential step of a plurality of steps of a bottling process where ones of the plurality of cam wheels selectively open one or more of the plurality of valves to perform a step of the bottling process, and where the plurality of cam wheels are rotated in unison for each sequential step of the plurality of steps, and wherein the plurality of steps are repeated with each full rotation of the plurality of cam wheels. The method also includes, during the bottling process, all of the valves of the plurality of valves are never opened together at a same time through each full rotation of the cam wheels. The method further includes, upon completing a bottling process in which at least one bottle is filled using the plurality of steps, rotating the common axle in a reverse direction through a plurality of rotational positions in which, for at least a first rotational position, at least one cam wheel of the plurality of cam wheels does not rotate initially with at least one other cam wheel of the plurality of cam wheels. And then, upon further rotation in the reverse direction, the plurality of cam wheels all rotate in unison, and for at least one rotational position in the reverse direction, as the plurality of cam wheels are rotated in unison in the reverse direction, all of the valves are opened at the same time.

In accordance with a further feature, rotating the cam wheels in the forward direction through consecutive rotational positions corresponding to consecutive steps of the bottling process includes rotating the plurality of cam wheels into a first rotational position to allow placement of a bottle in the bottling apparatus, then next rotating the plurality of cam wheels to a second rotational position, that is successive to the first rotational position, to purge the bottle of air using carbon dioxide, then next rotating the plurality of cam wheels to a third rotational position, that is successive to the second rotational position, to pressurize the bottle with carbon dioxide, then next rotating the plurality of cam wheels to a fourth rotational position, that is successive to the third rotational position, to fill the bottle with fluid content under pressure, then next rotating the plurality of cam wheels to a fifth rotational position, that is successive to the fourth rotational position, to depressurize the bottle; and then next rotating the plurality of cam wheels to a sixth rotational position, that is successive to the fifth rotational position, to apply suction to a fill tube that is placed into the bottle during the bottling process as the bottle is removed from the bottling flow control apparatus.

In accordance with a further feature, when rotating in the reverse direction, the at least one cam wheel of the plurality of cam wheels does not rotate initially with at least one other cam wheel of the plurality of cam wheels by allowing a drive member connected to the common axle to move freely within a cavity of the at least one cam wheel.

In accordance with a further feature, subsequent to rotating the cam wheels in the reverse direction, rotating the cam wheels in the forward direction, wherein the same at least one cam wheel of the plurality of cam wheels that did not rotate initially with at least one other cam wheel of the plurality of cam wheels when the common axle was rotated in the reverse direction does not initially rotate in the forward direction for at least one rotational position of rotation of the common axle, wherein the cam wheels are thereafter aligned to perform the sequential steps of the bottling process.

Although the invention is illustrated and described herein as embodied in a beer bottling flow control apparatus, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

As used herein the terms "respective" and "respectively" indicate a one-to-one exclusive relationship between one plurality of items and another plurality of items. For example, in the following disclosure there is described a plurality of cam wheels and a plurality of valves. Each cam wheel operates a respective one valve of the plurality of valves, meaning that each cam wheel operates one valve and each valve is operated exclusively by its respective cam wheel.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
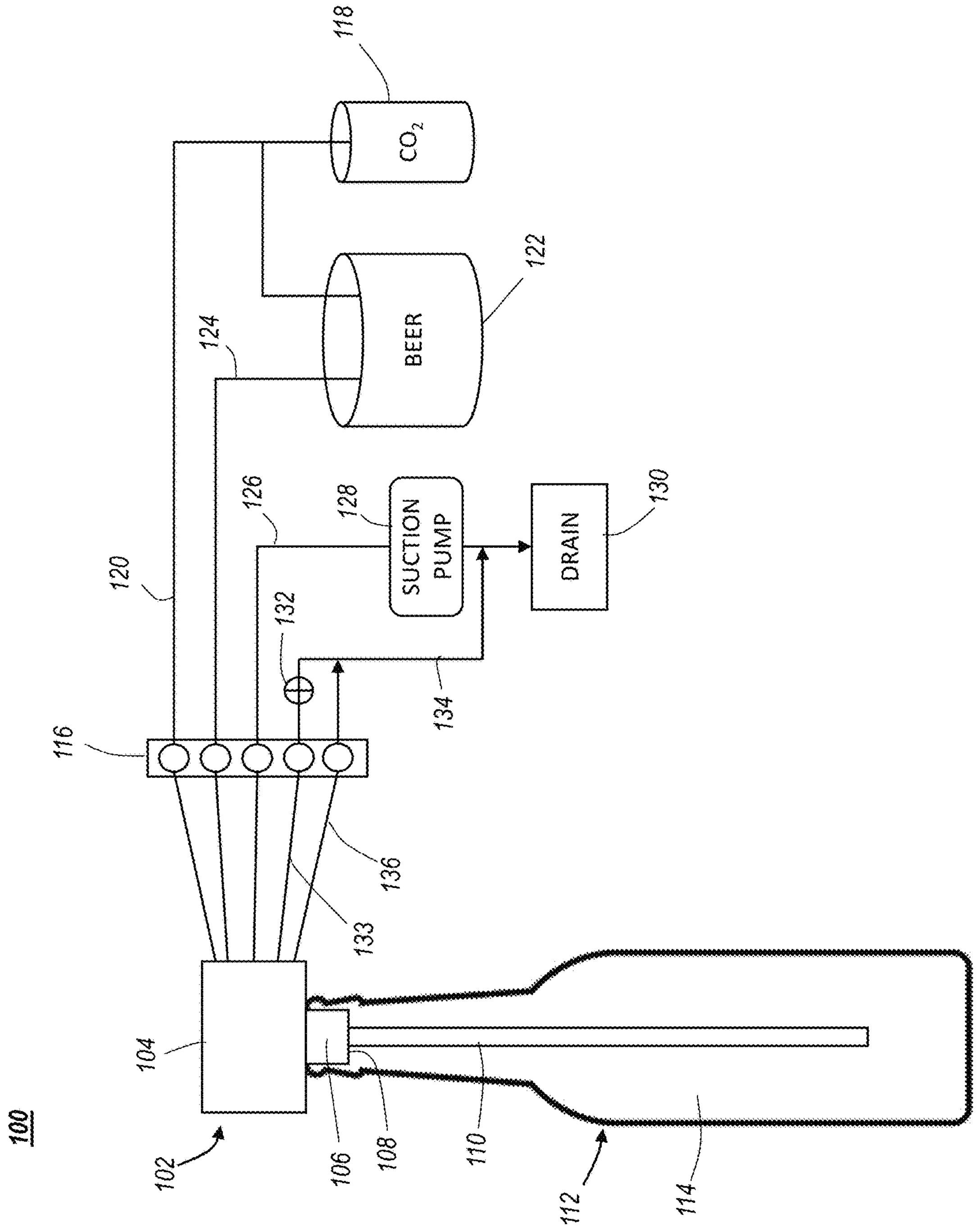
FIG. 1 shows a schematic system view of a bottling flow control apparatus, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 shows a schematic system view of a bottling flow control apparatus 100, in accordance with some embodiments. A bottle 112 is placed into engagement with a bottling head 102 (shown in more detail in FIG. 14). The bottling head 102 includes a cap block 104 into which there are several fluid channels for both inputs and outputs. An input is a channel through which something is put into the bottle 112, and an output is a channel through which something is take out of the bottle 112. A plug block 106 is sized to fit into the mouth of the bottle 112 and plug the bottle 112. There is an outlet 108 formed into the plug block 106 to let gas out of the bottle 112. A filling or fill tube 110 extends from the plug block 106 into the interior volume 114 of the bottle 112, and the filling tube 110 is fluidly connected in the cap block 104 to several inputs through the cap block 104. In general, carbon dioxide and beer are provided through input channels in the cap block 104 from separate lines attached to the cap block 104, which are fluidly coupled by the channels to the filling tube 110. Carbon dioxide is provided from a carbon dioxide source 118 via carbon dioxide tubing line 120 through a valve block 116 to a carbon dioxide input at the cap block 104. The carbon dioxide is also provided to a beer reservoir 122 to move beer through a fluid content tubing line 124 (beer line) that also passes through the valve block 116 and to a beer input at the cap block 104. Beer is used here as an example of fluid content that is dispensed into the bottle for storage a later consumption. Other types of fluid content can be used equivalently. A suction tubing line 126 is coupled through the valve block 116 to a suction pump 128, which is used to draw fluid back into the filling tube to reduce, if not eliminate, drippage from the filling tube 110 when the bottle 112 is removed from the bottling head 102, after being filled with beer. Thus, the suction line 126 is also fluidly coupled to the filling tube 110. The outlet 108 is fluidly coupled to a fast exit line 136 that is a depressurization tubing line, and a slow exit line 133 that is a pressurized fill tubing line that includes a regulator 132. The exit lines 133, 136 allow gas (carbon dioxide) to escape from the bottle to a drain line 134. Both excess carbon dioxide and beer (or other fluids) that are removed from the bottle 112 and bottling head 102 are directed to a drain 130. Thus, in the present example, there are five valves for each of five tubing lines, but different numbers of lines/valves can be used depending on the particular application.

The valve block 116 is a block through which compressible tubing for each of the different lines passes, and there is a separate, independently controlled valve mechanism for each of the various lines 120, 124, 126, 133, 136. Each of the valves is opened and closed according to a filling sequence, which will be discussed in more detail with regard to FIG. 15. To close a line, the respective valve mechanism compresses the tubing of the line such that no gas or fluid passes through the compressed point of the tubing. To open, the vale mechanism simply uncompresses the tubing to allow gar or fluid to pass through the tubing.

In general, at the start, when an empty bottle 112 is placed into engagement with the bottling head 102, all of the valves in the valve block 116 are initially closed. The valves in the valve block 116 are pinch valves, meaning they constrict the tubing of the lines to stop the flow of fluids (liquid or gas). To open a valve, the force used to bear against the line tubing is removed, allowing the tubing to open, and the corresponding fluid to flow through the valve in the tubing. Pinch type valves are considered to be normally open, meaning if no force is exerted to close them, they will be open.

In a first step, carbon dioxide is provided into the bottle 112 by opening the valve in valve block 116 controlling line 120. The carbon dioxide displaces air from the bottle 112 through the fast exit line 136, which means that the valve in valve block 116 for line 136 is also opened for this purging operation. Once purged, then the valve for line 136 is closed while the valve for line 120 remains open to pressurize the bottle with carbon dioxide. Once the bottle is pressurized, then the valve for the carbon dioxide line 120 is closed, and the valve for the beer line 124 and the slow exit line 133 are opened to allow the bottle to fill with beer under pressure. As the beer fills the volume of the bottle 112, carbon dioxide is allowed to exit through the slow exit line, including through the regulator 132, which maintains a desired pressure in the bottle during the filling stage. After being filled, the valves for the beer line 124 and slow exit line 133 are closed, and the valve for the fast exit line 136 is opened to depressurize the bottle. At this point the bottle is filled and ready to be removed from the bottling head 102, so the valve for the fast exit line 136 is closed, there is a pause to allow the bottle to disengage from the filling tube and the valve for the suction line 126 is opened, and the bottle is removed from the bottling head 102. The suction pump 128 can be activated upon detecting removal of the bottle 112 from the bottling head 102 to prevent dipping of fluid from the exposed filling tube 110. The process can then be repeated as desired, or instead, a cleaning operation can be performed where the lines are removed and cleaned, and stored until another batch of bottling is to be performed. In the cleaning stage, the beer 122 and carbon dioxide 118 are shut off at their source, and the suction pump is shut off, then all of the valves in the valve block 116 are opened to allow water or other cleaning fluids/solution through the lines 120, 124, 126, 133, 136.

Figure 14:
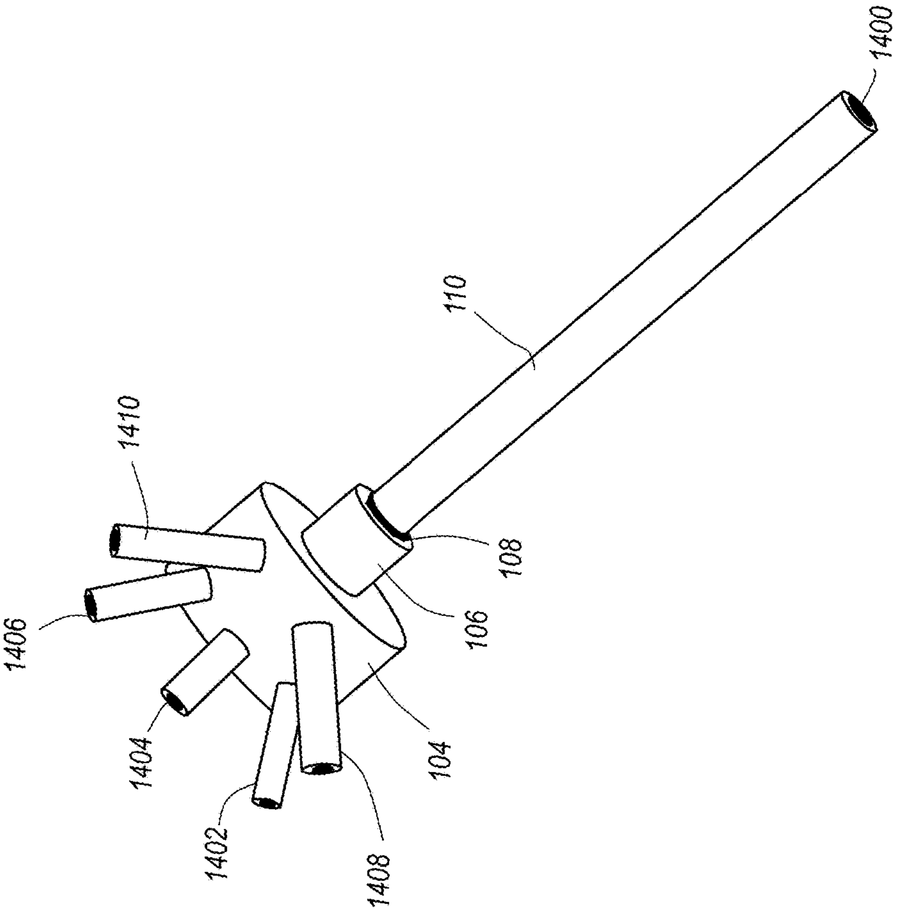
FIG. 14 shows a bottling head, in accordance with some embodiments.

FIG. 14 shows a bottling head 102, in accordance with some embodiments. A cap block 104 includes several tube fittings 1402-1410 that are configured to have an end of a tube line placed over them in a fluid-tight manner. Each of the tube fittings 1402-1410 is fluidly connected to either the outlet 108, or the bore 1400 of the filling tube 110. For example, fitting 1402 can be for carbon dioxide being provided into the bottle. Thus, fitting 1402 is fluidly connected to the bore 1400 of the filling tube 110. Fitting 1404 can be designated for beer, and is also fluidly connected to the bore 1400. Finally, fitting 1406 can be designated for suction, so that fluid left in the filling tube at the end of a bottling operation can be suctioned up into the filling tube 110 to reduce drip. Fitting 1408 can be designed for the slow gas exit, and can be further coupled to a gas or pressure regulator on the outside, as well as to outlet 108 through the inside of the cap block 104. Likewise, fitting 1410 can be designated for the fast gas exit and is also coupled to the outlet 108.

Figure 2:
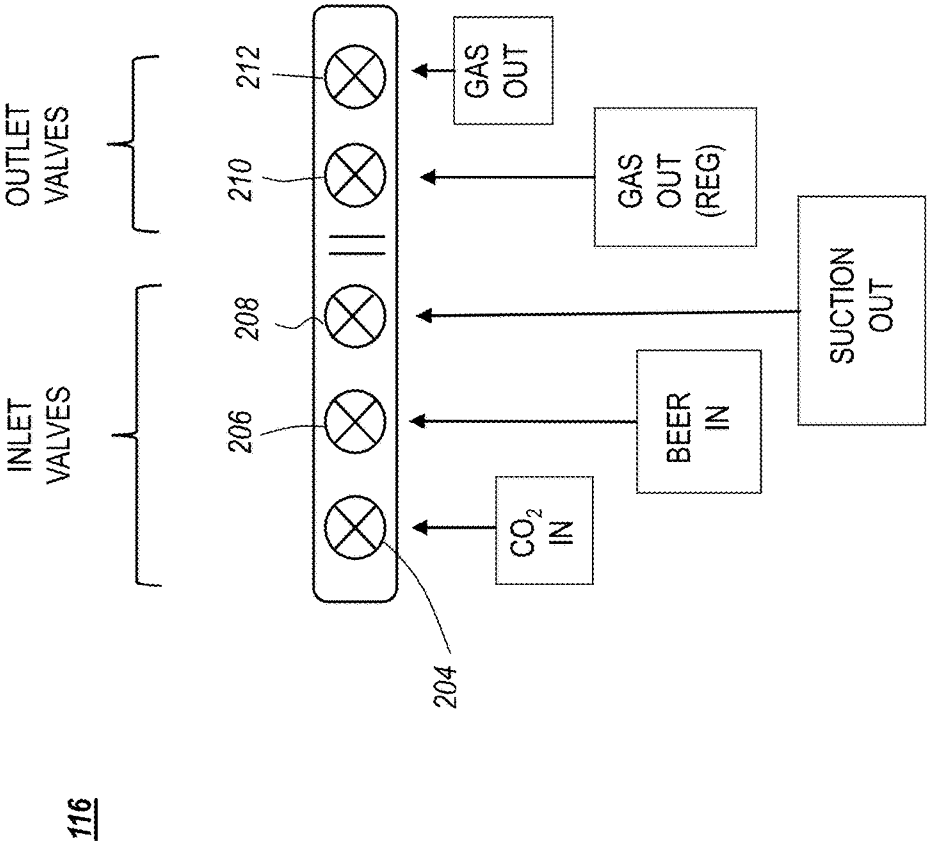
FIG. 2 shows a schematic representation of a valve block for a bottling flow control apparatus, in accordance with some embodiments.

FIG. 2 shows a schematic representation of a valve block 116 for a bottling flow control apparatus, in accordance with some embodiments. The valve block 116 shows an example of some types of lines that can be flow-controlled in a bottling operation, and the specific example is particularly useful in a single bottle bottling apparatus in which one bottle is filled at a time by the apparatus. Of course, multiple bottles could be filled in parallel by duplicating the apparatus illustrated in the drawings and described herein. It will be appreciated by those skilled in the field that the particular arrangement and ordering of valves and lines can vary, depending on the bottling application. There are a set of inlet valves 204, 206, and 208, and a set of outlet valves 210, 212. Each valve comprises an actuator that presses against the outside of a compressible tubing line to "pinch" the tubing line closed at the point where the actuator makes contact with the tubing line. To open the valve, the actuator is simple moved away from the tubing line, and the tubing line naturally opens, allowing material to pass through the tubing line. Each tubing line is for a particular fluid or gas, and as mentioned, there is an associated, and independently controlled compressing mechanism that can selectively compress or "pinch' the tubing to prevent the flow of fluid or gas through the tubing, and open so that fluid or gas can freely flow through the tubing. In the particular example, valve 204 controls carbon dioxide into the bottle, valve 206 controls the flow of beer into the bottle, valve 208 controls suction applied to the filling tube (e.g. 110) to prevent drippage after filling and removing the filled bottle from the apparatus. Outlet valve 210 controls a regulated outflow of gas from the bottle to maintain pressure in the bottle, and outlet valve 212 allows the rapid outlet of gas to depressurize the bottle after filling. An "X" is shown in each valve circle to indicate that the respective valve is closed, meaning the tubing line for that particular fluid/gas is pinched closed by an actuator.

Figure 3B:
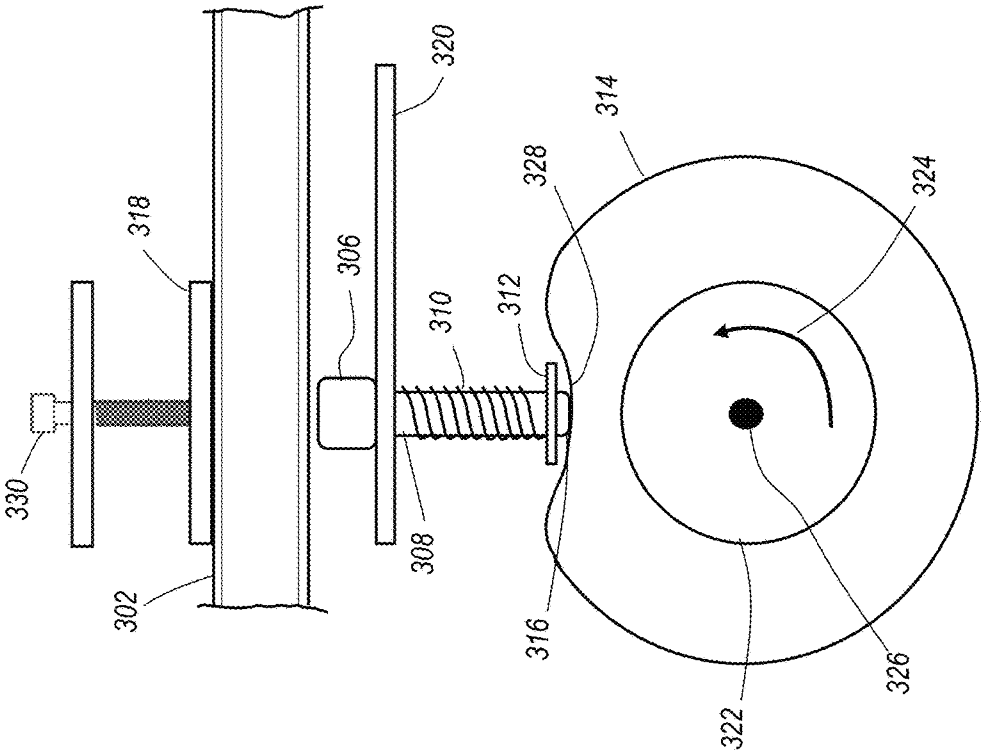
FIG. 3B shows a side view of the single valve line of FIG. 3A, with the valve open, in accordance with some embodiments.
Figure 3A:
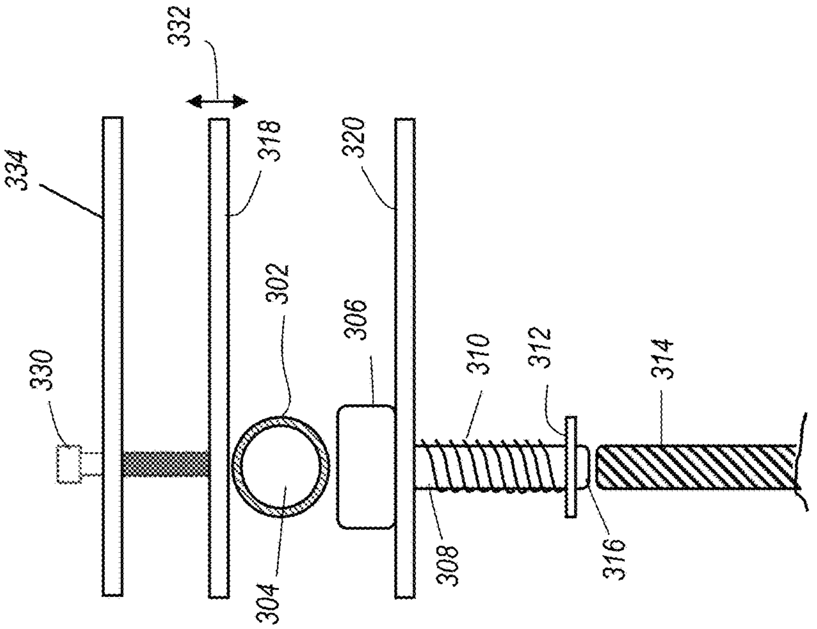
FIG. 3A shows a section view of a single valve line of a bottling flow control apparatus, with the valve open, in accordance with some embodiments.

FIG. 3A shows a section view of a single valve line of a bottling flow control apparatus in which the tubing 302 is cut or sectioned for viewing purposes, with the valve open, and FIG. 3B shows a side view of the single valve line of FIG. 3A, in accordance with some embodiments. There is a section of tubing 302 that has an interior channel 304 through which a fluid or a gas can be provided. The tubing 302 is adjacent a back or top wall 318 on one side, and there is a compressing head 306 also adjacent the tubing 302 on the other side of the tubing 302 from the back wall 318. The compressing head 306 is a firm member that is used to compress the tubing 302 against the back wall 318 to close off the flow of fluid or gas through the tubing 302. One or more adjustment bolts 330 can be used to adjust the position of the back wall 318, relative to a fixed wall 334, as indicated by arrow 332, to adjust the compression of the tubing 302.

In the present drawings of FIGS. 3A & 3B the tubing 302 is open, which allows the flow of fluid or gas through the tubing 302. The compressing head 306 is mounted on a shaft 308 that passes through a retaining wall 320. Although not necessary, a spring 310 may be provided around the shaft 308 to bias compressing head 306 away from the tubing 302. The spring 310 can bear against the retaining wall 320, and the spring keeper 312 at the distal end of the shaft 308. Thus, the spring 310 is aways under compression and urging the compressing head 306 away from the tubing 302. Ordinarily, the pressure in the tubing 302 will force the tubing 302 open at the point where the compressing head 306 had compressed the tubing 302 when the compressing head 306 is allowed to move away from the tubing 302, such as when the valve cam 314 is rotated so that the relief 328 is aligned with the bottom end of shaft 308. In some embodiments, the spring 310 may be used to ensure the shaft 308 moves when the relief 328 is aligned with the shaft 308, to overcome, for example, any resistance that may be present and tending to create friction or otherwise resist movement of the shaft 308.

The valve cam 314 is a circumferential cam that provides cam bearing surface about the circumference of the cam wheel. The radius of the cam wheel decreases along the relief 328. To close the valve, a valve cam 314 engages the shaft 308 at the distal end 316 of the shaft. The valve cam 314 provides a surface that bears against the distal end 316 of the shaft 308 as the valve cam 314 is rotated for each step of the procedure. The valve cam 314 is part of a cam wheel that includes a hub 322 and an axle 326. The hub 322 is a circular central portion of the cam wheel. The cam wheel is rotated about the axle 326, as indicated by the arrow 324. The cam 314 is not of uniform radius from the axle 326, and can have one or more sections of relief 328 to allow the valve to open, as shown here. It should be noted that dimensions of the cam 314 are exaggerated here to illustrate the principle of operation.

Figure 4B:
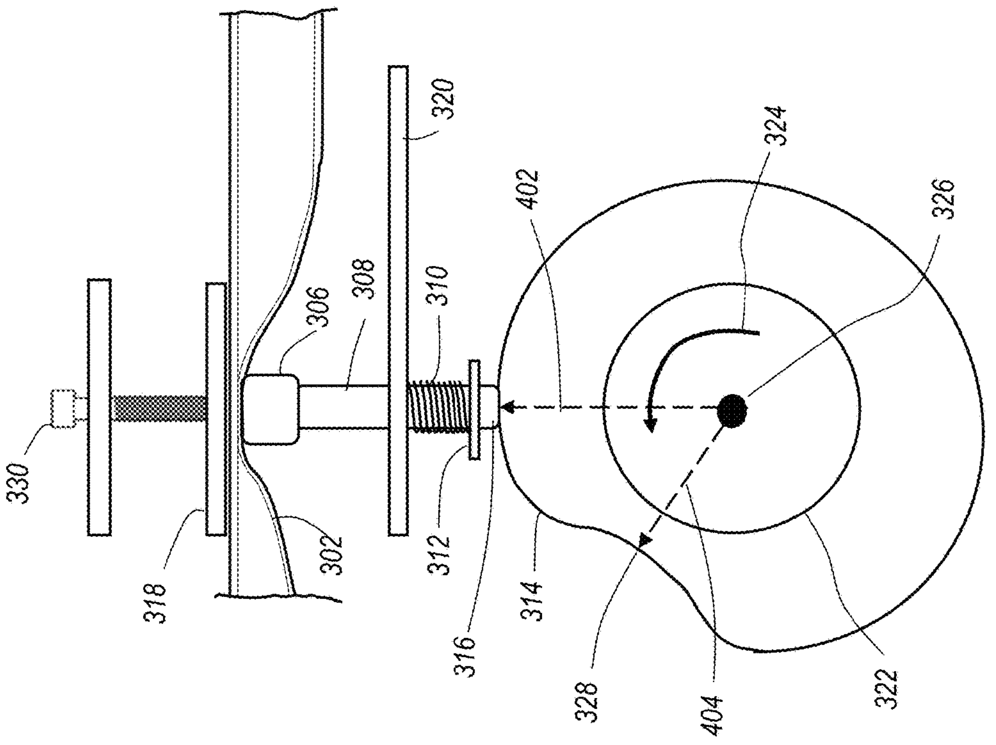
FIG. 4B shows a side view of the single valve line of FIG. 4A, with the valve closed, in accordance with some embodiments.
Figure 4A:
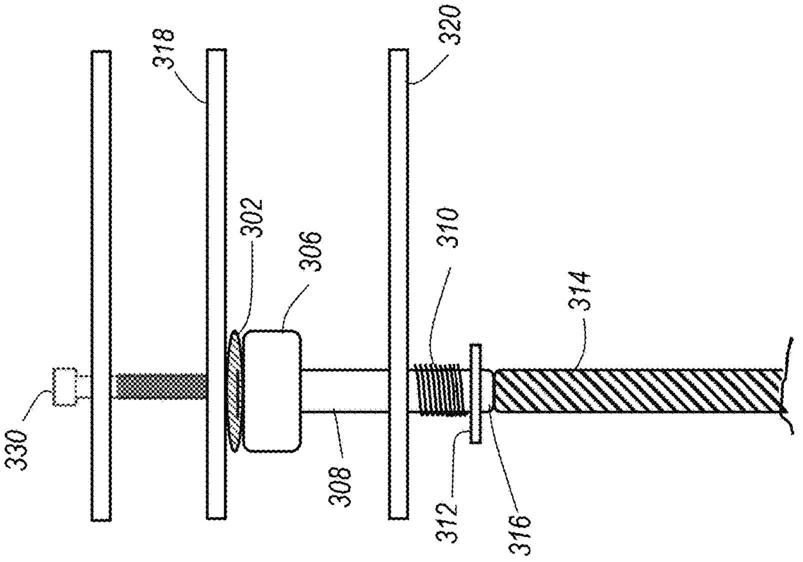
FIG. 4A shows a section view of a single valve line of a bottling flow control apparatus, with the valve closed, in accordance with some embodiments.

FIG. 4A shows a section view of a single valve line of a bottling flow control apparatus, and FIG. 4B shows a side view of the single valve line of FIG. 4A, with the valve closed, in accordance with some embodiments. In FIGS. 4A, 4B, the cam 314 has been rotated from that shown in FIG. 3B by about sixty degrees. The radial distance 404 to the outside of the cam 314 at the relief 328 is less than that elsewhere around the cam 314, such as radial distance 402. As indicated in FIGS. 3A and 3B, in FIGS. 4A, 4B, and FIG. 5, adjustment bolts 330 adjust the distance between the back wall 318 and compressing head 306 in order to ensure that sufficient compression of the hoses 302 is produced so that the pinch created when the compression head 306 is fully actuated by the cam 314 a reliable seal is achieved, but the compression force is not so much as to damage the hose 302 and/or ensure that the axle 326 is not deflected or bent from its axis. Thus, as the cam 314 rotates, it maintains the valve closed by pressing against the distal end 316 of the shaft 308, which pushes the compressing head 306 against the tube 302, with enough force to close off the tube 302 and prevent any gas or fluid from conducting through the tube 302. The cam 314 will maintain the tube closed until the relief portion 328 of the cam is again aligned with the distal end 316 of the shaft 308. The cam 314 shown here includes only one relief portion 328, but for some valves there can be multiple times during the bottling operation when a given valve must be opened. Referring back to FIG. 2, each of the valves 204-212 will have their own tubing, cam wheel with a cam, compression head, shaft, etc. The cam wheels can be rotated in unison through discrete steps, with each cam providing relief for its respective valve at an appropriate step in a sequence for the specific bottling operation.

Figure 5:
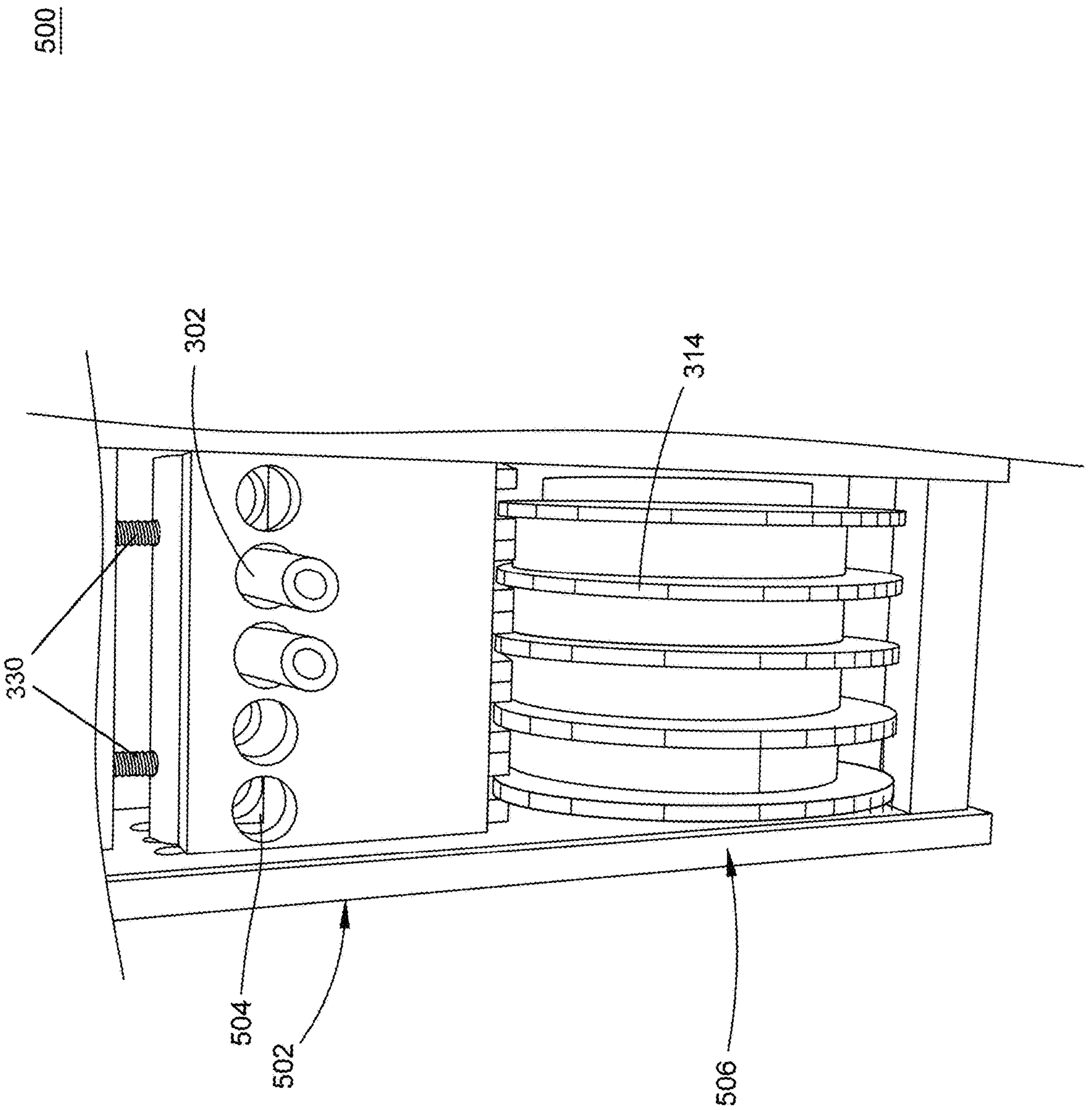
FIG. 5 shows a front view of a valve block of a bottling flow control apparatus with all of the valves in a closed position, in accordance with some embodiments.
Figure 6:
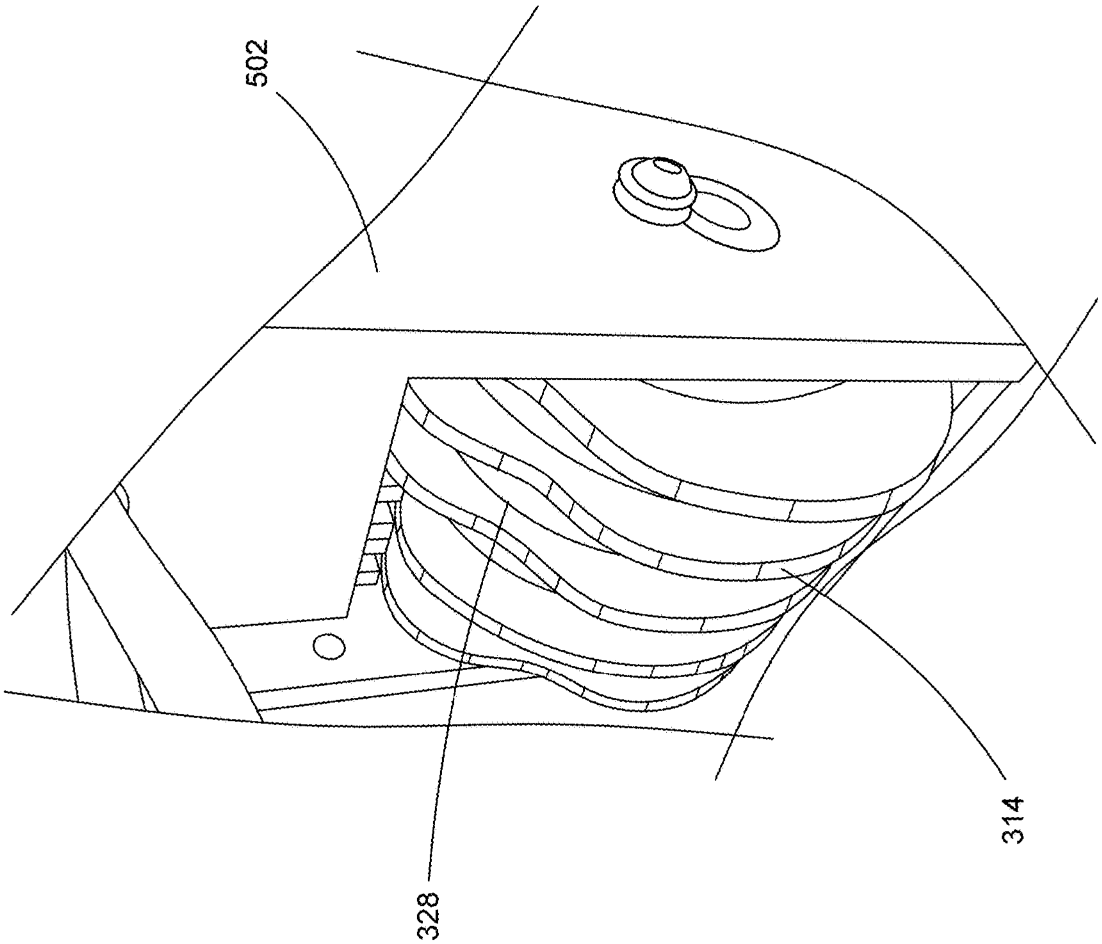
FIG. 6 shows a front perspective view a valve block of a bottling flow control apparatus with the valves in various different states of being closed and open, in accordance with some embodiments.

FIG. 5 shows a front view of a valve block 500 of a bottling flow control apparatus with all of the valves in a closed position, in accordance with some embodiments. There is a series 506 of five cam wheels, each having its own cam 314, mounted on a common axle (e.g. 326). The five cam wheels are rotated, in unison, in steps of, for example, sixty degrees. That is, for each step of the bottling process, the cam wheel assembly, meaning all of the cam wheels in the series 506, are rotated sixty degrees. This allows for six unique bottling steps when the cam wheels are rotated in a first direction. This also means that the relief 328 used to allow a given valve to open spans sixty degrees or less of the outer perimeter of the cam 314, unless the valve is to remain open for successive steps in the process. The specific cam 314 of each cam wheel generally maintains each valve closed throughout the bottling process until in a given step of the bottling process the respective valve is to be opened. Tubing 302 passes through openings 504 in the frame 502 of the valve block 500, for each valve. Each tubing line is for a different fluid or gas. The compressing head, shaft, and bias spring for each valve are located inside the frame 502, and are controlled by the cam 314 corresponding to each valve. Accordingly, there are five cam wheels providing five cams, respectively, for each of five valves, which can include the three inlet valves (e.g. 204, 206, 208) and the two outlet valves (e.g. 210, 212). Rotation of the cam wheels 506 can be controlled by, for example, a step motor or equivalent, according to a controlled bottling sequence. FIG. 6 shows a front perspective view a valve block 500 of a bottling flow control apparatus with the valves in various different states of being closed and open, in accordance with some embodiments. Here, a relief portion 328 of the cam 314 can be seen. When the relief portion 328 of the cam 314 is aligned with the distal end (e.g. 316) of a valve shaft (e.g. 308) the valve will be open. Otherwise, the cam 314 maintains the valve closed through its cycle of rotation. The cam wheels rotate in unison as they are rotated in one direction, while the bottling process is being repeated for successive bottles. The rotation occurs in steps, which, in the present example, occur in sixty degree turns of rotation, meaning for each step of the bottling process, the cam wheels are rotated sixty degrees of a full three hundred sixty-degree rotation.

Figure 7:
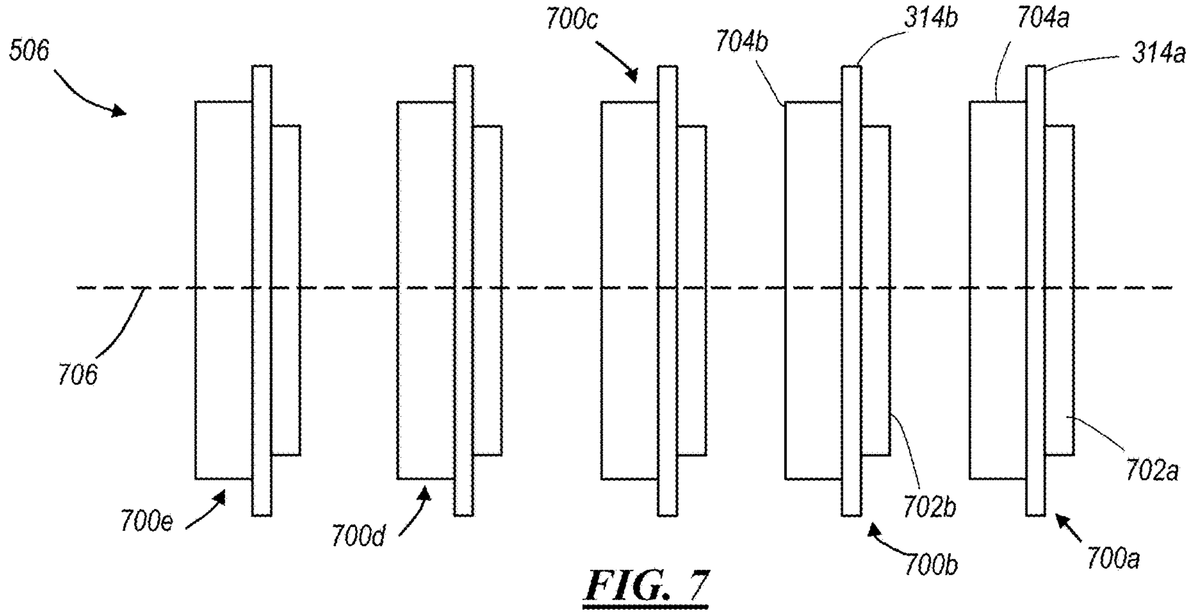
FIG. 7 shows an exploded elevational view of a nesting valve cam wheel system for controlling a plurality of bottling lines, in accordance with some embodiments.
Figure 8:
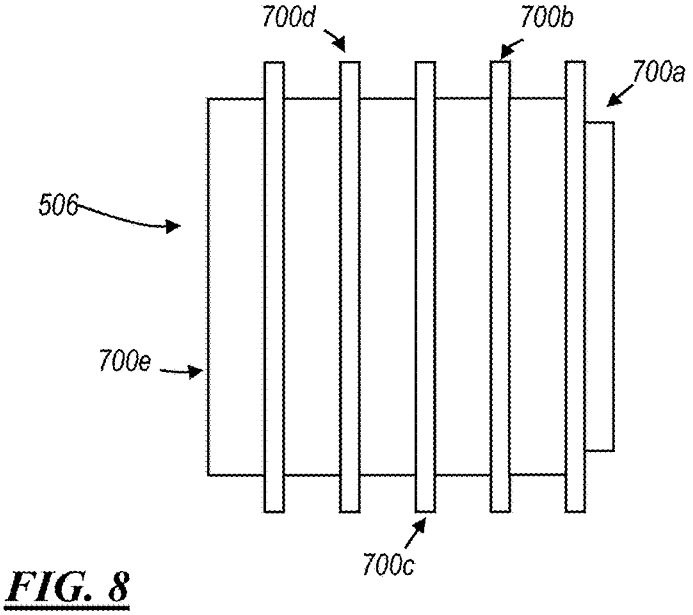
FIG. 8 shows an assembled elevational view of a nesting valve cam wheel system for controlling a plurality of bottling lines, in accordance with some embodiments.

FIG. 7 shows an exploded elevational view of a nesting valve cam wheel system 506 for controlling a plurality of bottling lines, and FIG. 8 shows an assembled elevational view of a nesting valve cam wheel system 506 for controlling a plurality of bottling lines, in accordance with some embodiments. In each figure there are shown five valve cam wheels 700*a*, 700*b*, 700*c*, 700*d*, and 700*e*. Each cam wheel 700*a-e* includes a cam 314 (numbered 314*a*-314*e* here) having a particular cam profile for controlling a respective valve of a valve block. The cam profile refers to the distance from the axle that provides the axis of rotation to the outer perimeter of the cam 314 around the circumference of the cam. For example, for a cam that controls a valve that is only opened once during the bottling process, the cam will only have one relief 328. Thus, that one relief will occupy less than sixty degrees around the outer perimeter of the cam and the other three hundred degrees of the cam will be at a distance from the axle that is selected to maintain the respective valve closed, and generally following a circular profile, meaning a constant radial distance from the axle at the center of the cam wheel. The relief or reliefs of each cam wheel depart from that radial distance that keeps the valve closed along the sixty degrees of rotation/travel for the cam wheel corresponding to the step of the process where the valve is opened, and have a shorter radial distance over that sixty degrees to allow the valve to open when the cam wheel is rotated such that the relief is in alignment with the valve shaft, thereby allowing the valve to open.

The cam wheels 700*a-e* are mounted so that they have a common axle 706. Each cam wheel 700*a-e* includes interlocking hub features so that the entire cam wheel system 506 can be driven in unison, meaning rotated about the common axis 706, in discreet steps, to control the respective valves in each of the several bottling steps. In implementation, there will be a common axle along axis 706 on which the cam wheels 700*a-e* are mounted. Each cam wheel 700 can include an interior hub 702 (e.g. 702*a*, 702*b*) on a first side of the cam wheel 700*a-e* and an exterior hub 704 (e.g. 704*a*, 704*b*, 704*c*). The interior hub 702 on one cam wheel 700 fits within the exterior hub 704 of an adjacent cam wheel 700. Thus, for example, interior hub 702*b* of cam wheel 700*b* fits within exterior hub 704*a* of cam wheel 700*a*. There can be interlocking features that create a mechanical interference between cam wheels 700 that transfers the drive force applied to one cam wheel (e.g. 700*a*) to the adjacent cam wheel, and thereby to all of the other cam wheels as well. Since the interior hub 702 fits within an exterior hub 704, the exterior hub 704 can be, for example, a wall that extends, in a direction parallel to the axis 706, from the side of the cam wheel, and forms a circle/cylinder around the axis 706 and some radius away from the axle, where the radius is larger than the radius of the internal hub 702 to ensure that the internal hub of one cam wheel will fit inside the external hub of the adjacent cam wheel.

Figure 9:
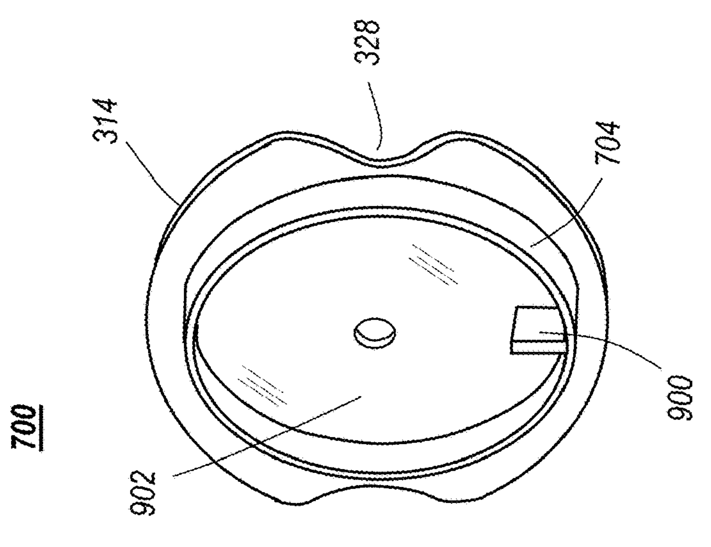
FIG. 9 shows a first side perspective view of a nesting valve cam wheel, in accordance with some embodiments.

FIG. 9 shows a first side perspective view of a nesting valve cam wheel 700, in accordance with some embodiments. In particular, the side of the cam wheel 700 shown is the side having the exterior hub 704, which defines a cavity or space 902 into which an internal hub 702 can fit. There is an interlocking feature 900 that extends into the cavity 902, and which is configured to mate into a corresponding recess (e.g. 1100, 1102) so that drive force applied to one cam wheel is transferred to the nested cam wheel throughout the entire cam wheel assembly 506. Thus, the interlocking feature 900 operates as a drive member to impart rotational force to the cam wheel in which the interlocking feature 900 is seated. As can be seen, the cam wheel 700 includes a cam 314 that can have one or more reliefs 328. The cam 314 is defined in a plane through the cam wheel 700 that is perpendicular to the axis of the axle 706, and has an outer surface that is at either the longer radius 402, which keeps the valve closed, or the shorter radius 404, at a relief portion 328, which allows the valve to open. The transitions between these portions of different radii are smooth so as to be able to slide against the distal end 316 of the valve shaft 308 without catching or binding as the cam surface moves past the shaft. The cam wheel 700 shows an example of a cam wheel that has a circumferential cam 314 with two or more reliefs 328 for opening its respective valve at two (or more) steps of the particular bottling process.

Figure 10:
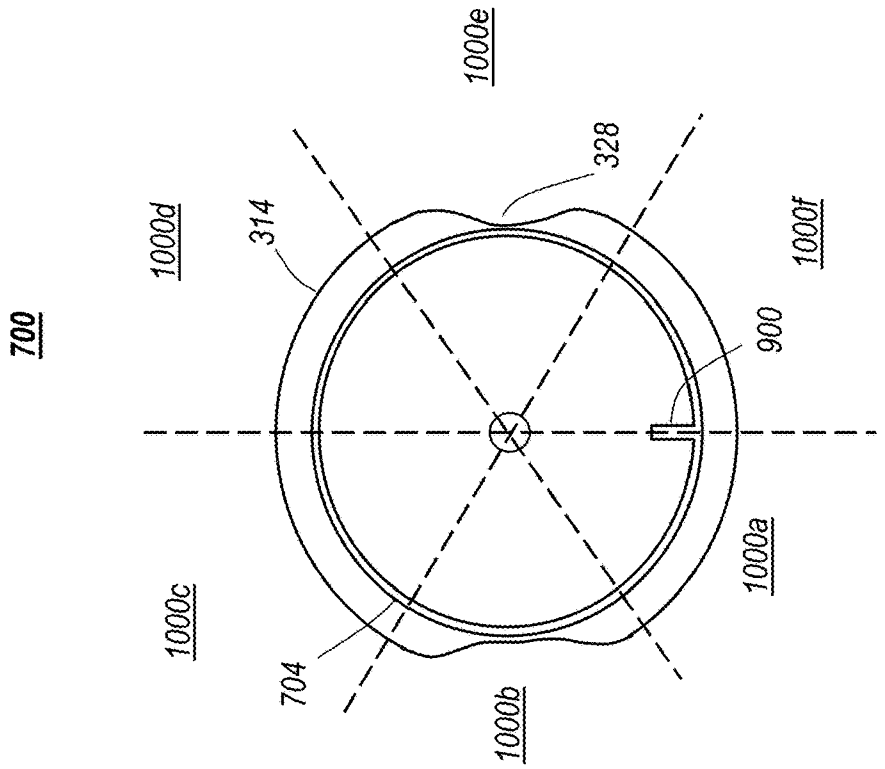
FIG. 10 shows an elevational view of a first side of a nesting valve cam wheel, including a plurality of state positions, defined for the valve cam wheel, in accordance with some embodiments.

FIG. 10 shows an elevational view of a first side of a nesting valve cam wheel, including a plurality of state positions, defined for the valve cam wheel, in accordance with some embodiments. Since the cam wheels are rotated in unison about the axle 706, there can be defined a number of sectors of rotation equal to the number of steps in the bottling process. In the present example, there are six steps for filling each bottle, thus, there are six sectors 1000_a_-1000_f_ defined, which each one corresponding to about sixty degrees of rotation. Thus, for example, for a given bottling operation, at the start of the operation, sector 1000_a_ can be positioned at the top-most position, resulting in the corresponding valve being closed. Then for the next step in the bottling operation, the cam wheel 700 can be rotated sixty degrees so that sector 1000_b_ is that the top-most position, which results in the corresponding valve opening. This process can continue until the cam wheel 700 has been rotated through each of the remaining sectors 1000_c_, 1000_d_, 1000_e_, 1000_f_, and back to sector 1000_a_ being at the top-most position. Thus, the valve operated by the cam wheel 700 will be closed when sectors 1000_s_, 1000_c_, 1000_d_, and 1000_f_ are top-most, and the valve will be open when sectors 1000_b_ and 1000_e_ are rotated to the top-most position, assuming a valve block construction as shown in FIGS. 3A-6 where the cam wheels are positioned below the valve mechanism and tubing lines.

Figure 11B:
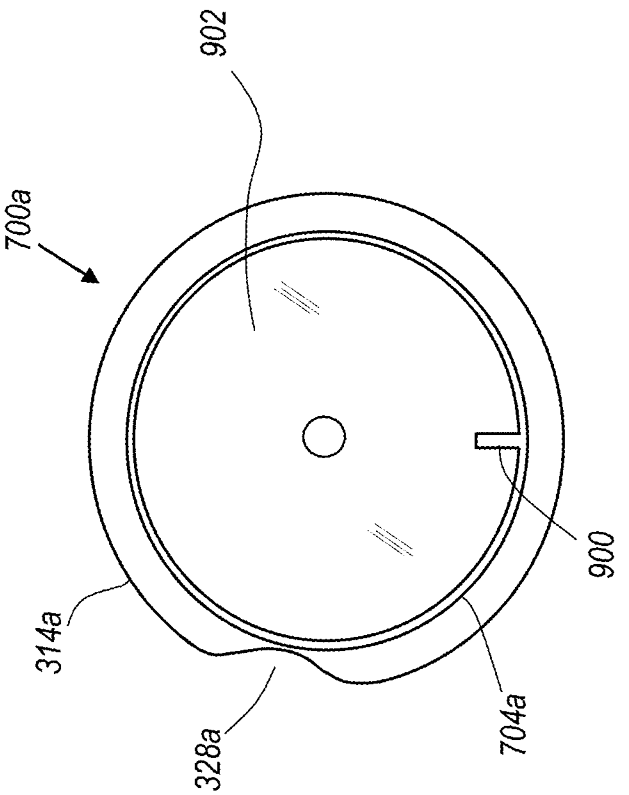
FIG. 11B shows a first side elevational view of a nesting valve cam wheel that nests into the valve cam wheel of FIG. 11A, to transfer rotational drive from one nesting cam wheel to the next, in accordance with some embodiments.
Figure 11A:
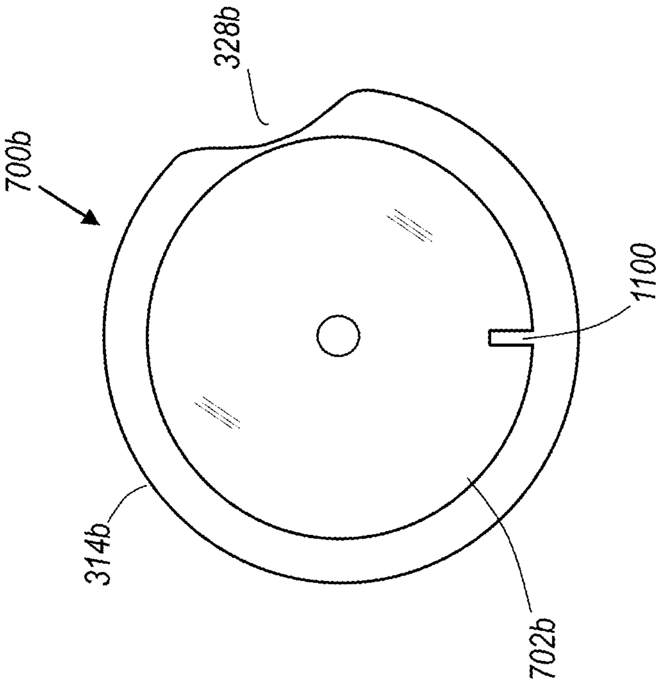
FIG. 11A a second side elevational view of a nesting valve cam wheel, in accordance with some embodiments.

FIG. 11A a second side elevational view of a nesting valve cam wheel 700_b_, and FIG. 11B shows a first side elevational view of a nesting valve cam wheel 700_a_ that nests into the valve cam wheel 700_b_ of FIG. 11A to transfer rotational drive from one nesting cam wheel to the next, in accordance with some embodiments. Specifically, the view of FIG. 11A shows the side of cam wheel 700_b_ having the interior hub 702_b_, and FIG. 11B shows the side of cam wheel 700_a_ that has the exterior hub 704_a_. In general, the interior hub 702_b_ fits into the exterior hub 704_a_. Without more, the exterior hub 704_a_ would simply slide around interior hub 702_b_ because they are concentric and circular. However, the exterior hub 704_a_ includes a tang 900 that extends into the cavity 902, and the interior hub 702_b_ includes a notch 1100 that is sized to receive the tang 900. The tang 900 fitting into the notch 1100 locks the two cam wheels 700_a_, 700_b_ together so that if cam wheel 700_a_ is turned (rotated about the axle axis), then cam wheel 700_b_ will likewise turn as the rotational force is transferred through the tang 900 to the sides of the notch 1100. Similar features can be used to join the other cam wheels as well. Two cam wheels like 700_a_, 700_b_ shown here will be locked in both directions, and will turn sector for sector with each other. However, it is desirable to allow some cam wheels to shift position, relative to their adjacent cam wheels, in terms of sectors of rotation about the axle axis.

Figure 12A:
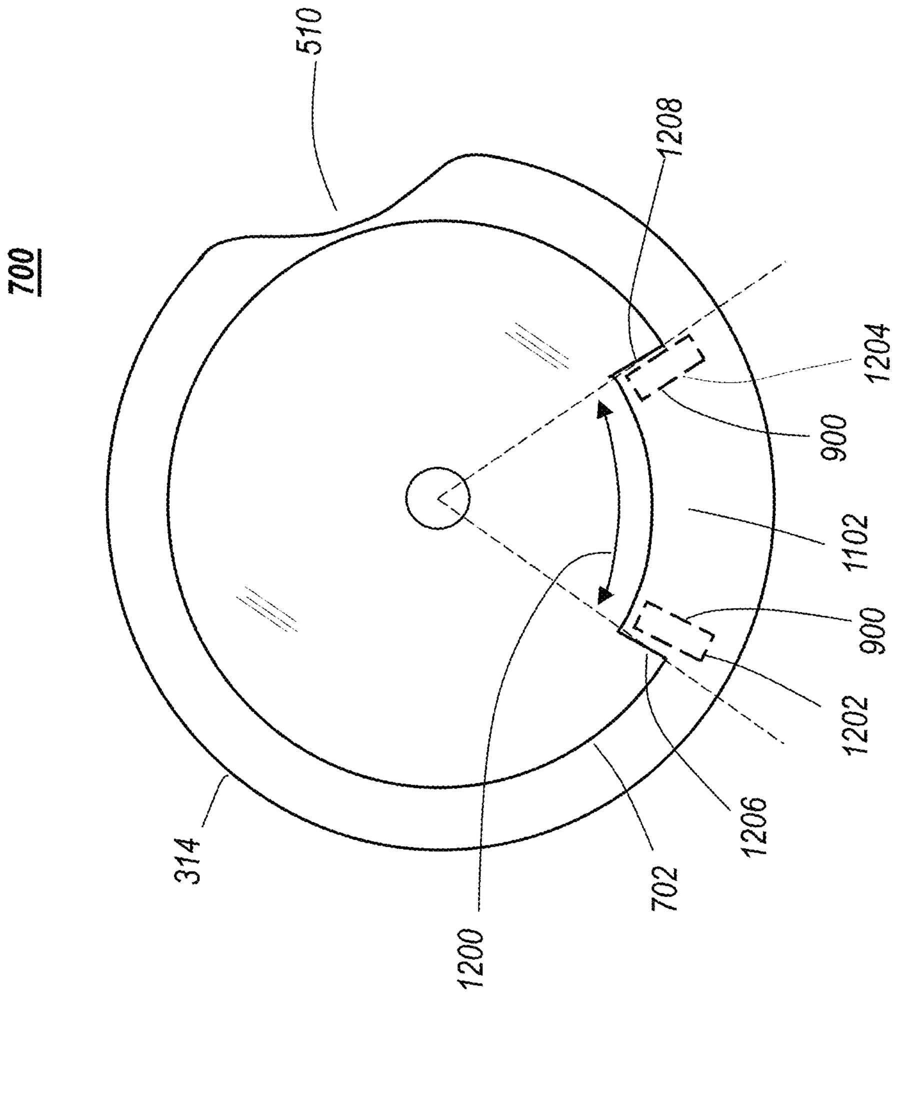
FIG. 12A shows an elevational view of a second side of a nesting cam wheel that allows a position adjustment when drive rotation is reversed, in accordance with some embodiments.
Figure 12B:
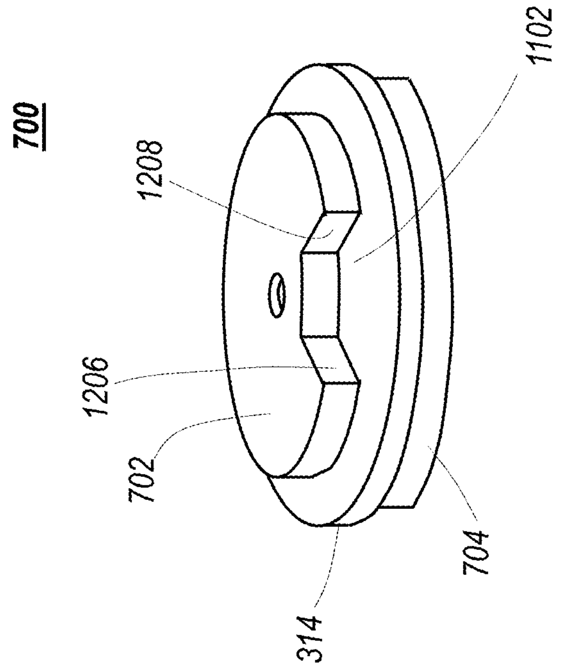
FIG. 12B shows a side perspective of the nesting cam wheel of FIG. 12A.

FIG. 12A shows an elevational view of a second side of a nesting cam wheel 700 that allows a position adjustment when drive rotation is reversed, in accordance with some embodiments. FIG. 12B shows a side perspective view of the nesting cam wheel 700. As with FIG. 11A, the side of the cam wheel shown here include the interior hub 702. However, instead of having a notch 1100 that is sized to fit the tang 900, a notch 1102 is used that spans at least one sector of rotation, which, in a system that has six steps, would be sixty degrees. Thus, the angle between the sides of the notch 1102 as indicated by arrow 1200 is sixty degrees. This allows the tang of the adjacent cam wheel to move one sector position relative to cam wheel 700 shown here when reversing drive direction. Thus, for example, when the cam wheels are being rotated in a clockwise direction, when viewed from a side in the direction of the axle, the tang will be at position 1202 and bear against the first sidewall 1206 of the notch 1102. However, when the direction of rotation is reversed, then the tang 900 will move in the notch 1102 until it bears against the second sidewall 1208 of the notch 1102 to drive the cam wheel counter-clockwise. One or more of the cam wheels can be provided with feature like this to allow a relative change of position between adjacent cam wheels when switching direction of rotation. This can allow, for example, a seventh position of the cam wheels. When the cam wheels are rotated in a first, or "forward" direction, each successive sector of rotation corresponds to a successive step in the bottling process, and in each step different ones of the valves are opened, while others are closed. However, when the direction of rotation is reversed, because one or more of the cam wheels can rotate one or more sectors before engaging the successive cam wheel, it is possible to, for example, align the reliefs of all of the cam wheels so that all of the valves are open at the same time, which is convenient for cleaning the bottling apparatus after completing a bottling session.

Figure 13B:
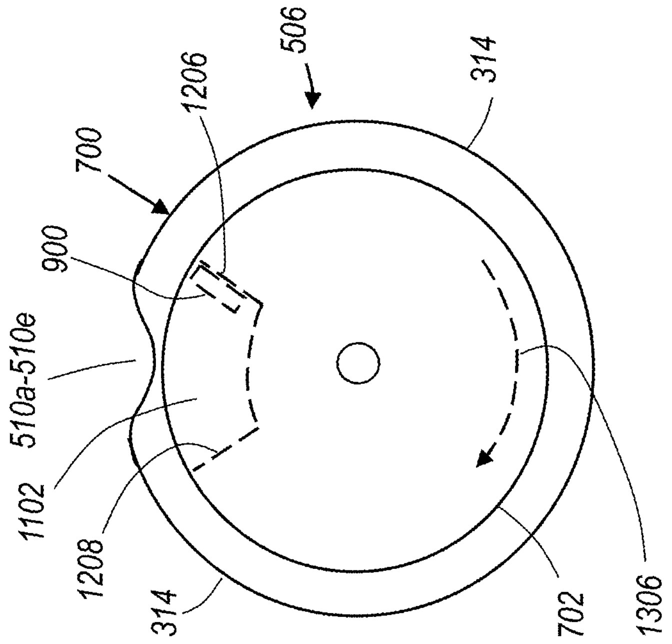
FIG. 13B shows an end elevational view of a plurality of nested valve cam wheels when conducting a cleaning operation, in accordance with some embodiments.
Figure 13A:
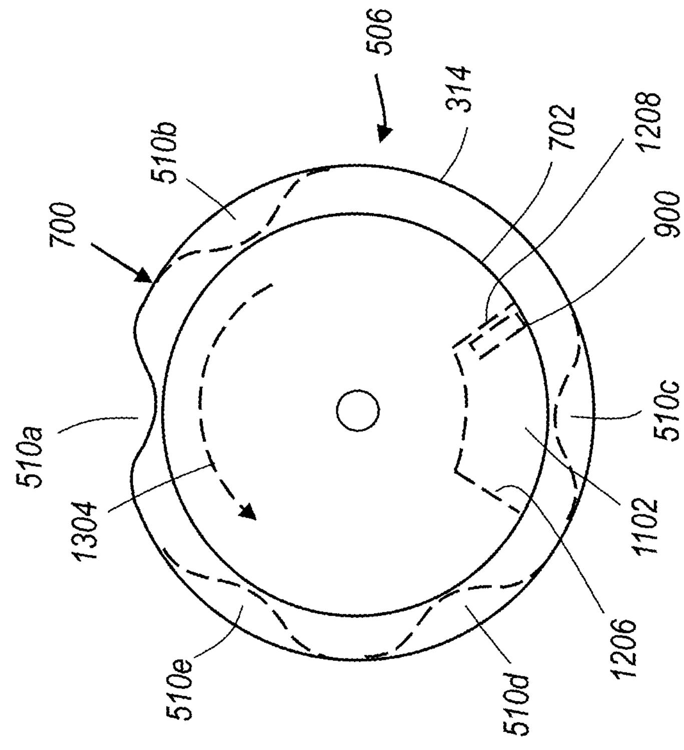
FIG. 13A shows an end elevational view of a plurality of nested valve cam wheels when conducting a bottling flow control operation, in accordance with some embodiments.

FIG. 13A shows an end elevational view 1300 of a plurality of nested valve cam wheels when conducting a bottling flow control operation, in accordance with some embodiments. In the present view, only the cam wheel on the end of the assembly 506 is seen, but there are shown various reliefs 510_a_-510_e_ of the other cam wheels in the background shown in broken line at various rotational positions, each of which are defined as an increment of rotation. For example, in a process which include six steps, there are six increments of rotation to a full three hundred sixty degrees of rotation. Relief 510_a_ is a relief in the cam 314 of cam wheel 700, while reliefs 510_b_-510_e_ are shown in broken line and in different sectors around the cam wheel assembly. The cam wheels are rotated in the direction of arrow 1304 through consecutive rotational positions for bottling operations in discrete steps, and the relief 510_a_-510_e_ of each cam wheel will be at the top position during different steps in the bottling process. In addition, there is one notch 1102 shown in broken line, along with a tang 900. When the cam wheels are rotated in the direction of arrow 1304, the tang 900 bears against radial wall 1208 of the notch 1102, imparting drive force from the tang 900 of one cam wheel to the wall 1208 of the adjacent cam wheel.

Again, the bottling process is a series of steps, and the cam wheels are rotated one rotational position (e.g. sixty degrees) for each successive step. In the exemplary bottling processes described herein, there are six steps, thus each rotational position is one sixth of the full rotation, or sixty degrees of rotation. From one step to the next step the cam wheels are rotated sixty degrees. This is repeated for each step of the process. In each step one or more of the reliefs 510_a_-510_e_ are positioned at the top or in the valve block, which allows the valve mechanism corresponding to the relief to open for the particular step of the bottling process. In at least one of the steps, however, all of the valves are closed, meaning that none of the cam wheels have a relief positioned at the top position in the valve block, which can be an initial step where a filled bottle is removed and an empty bottle is loaded into the bottling apparatus. During the bottling operation, the cam wheels are jointly rotated in unison about a common axis, by virtue of, for example, a tang 900 of one cam wheel that bears against a side of a notch 1100 or 1102 in an adjacent cam wheel such that all of the cam wheels are locked together in rotation through each of the several sectors of rotation for each of the various bottling operations, allow each successive bottle to be filled appropriately until the batch of bottling or the bottle session is complete.

When the bottling session is complete, the bottling apparatus needs to be cleaned. This is facilitated by, as indicated by arrow 1306 of FIG. 13B, rotating the cam wheels in the reverse direction to that of the direction of rotation of FIG. 13A. FIG. 13B shows an end elevational view 1302 of a plurality of nested valve cam wheels when conducting a cleaning operation, in accordance with some embodiments. Because one or more of the cam wheels is configured to let an adjacent cam wheel change rotational alignment relative to each other, by reversing the direction of rotation for one or more rotational positions, all of the reliefs 510_a_-510_e_ can be aligned at a common rotational position and then rotated to the top, in the valve block, as shown in view 1302. To illustrate this, it can be seen that tang 900 is bearing against the opposite radial wall 1206, meaning the tang 900 traversed across the arc width of the notch 1102 as the cam wheel having the tang 900 was rotated in the reverse direction before imparting reverse rotational drive force to the adjacent cam wheel having the notch 1102. The notch 1102 can have an arc width of one or more rotational steps (each step being sixty degrees in the present example). That means the cam wheel having the tang 900 is rotated in the reverse direction at least one step before the adjacent and subsequent cam wheels in the series are driven to also rotate. This allows one or more of the cam wheels to rotate independently of an adjacent cam wheel for one or more rotational positions. Thus, when being driven in the direction of arrow 1304, the reliefs 510_a_-510_e_ of the several cam wheels are positioned such that at each successive step of the bottling process, one or more of the valves is opened in a manner corresponding to that specific step of the process, or none of the valves are open for an initial step of the process. Then, when the bottling is complete for the time being, and the bottling apparatus must be cleaned, then cam wheels are rotated in the reverse direction, as indicated by arrow 1306, until all of the reliefs are aligned and at the top position to open all of the valves, which can allow, for example, removal of the tubing lines for cleaning.

Figure 15:
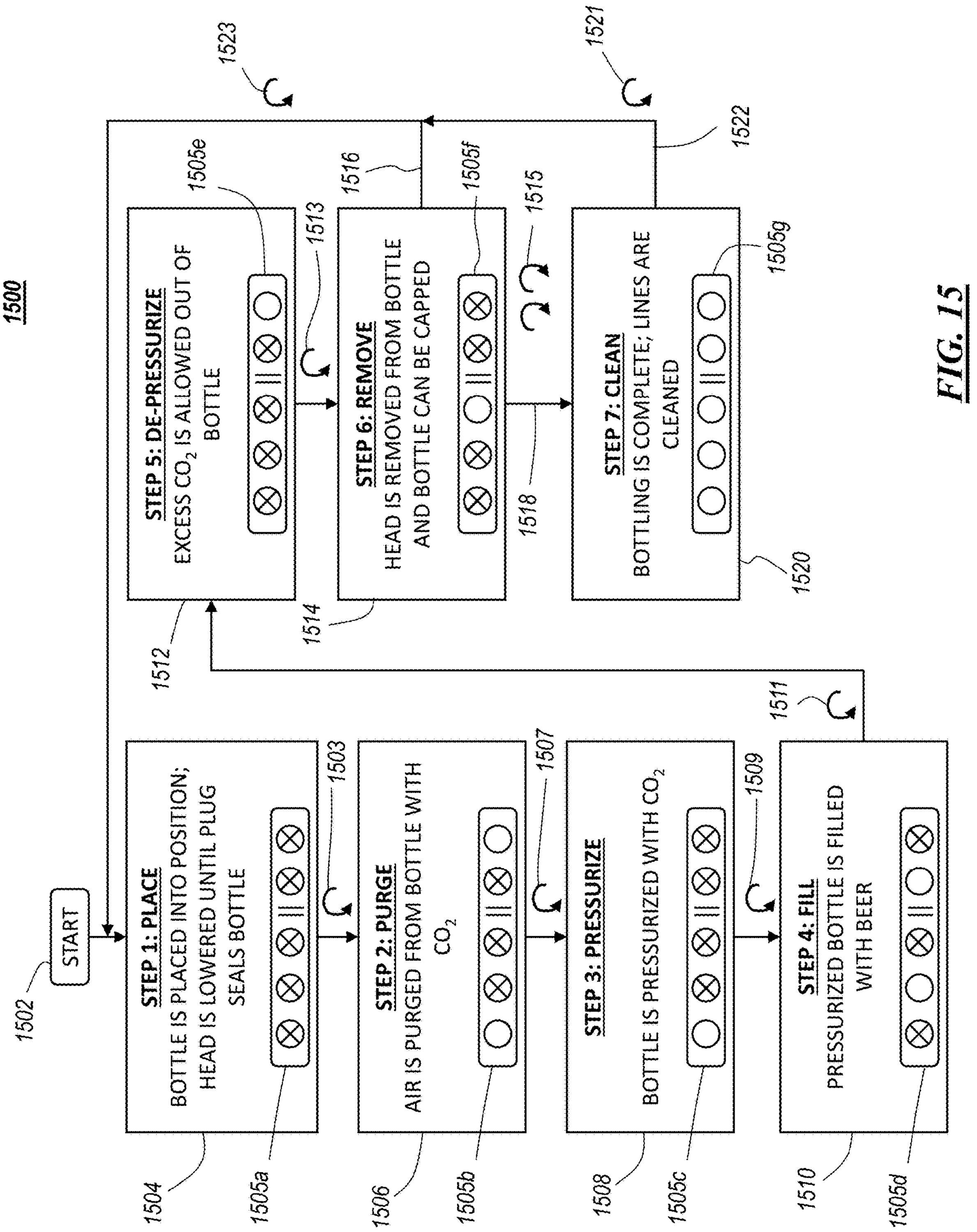
FIG. 15 shows a flow diagram of a process of bottling flow control, in accordance with some embodiments.

FIG. 15 shows a flow diagram of a process 1500 of bottling flow control, in accordance with some embodiments. At the start 1502, a bottling apparatus is provided that uses a plurality of nested or adjacent cam wheels to control the opening and closing of several tubing lines through corresponding valve mechanisms. The nested cam wheels are rotated in unison in discreet steps of sixty degrees in the present example. Each discreet step of rotation corresponds to a successive sequential step of the process 1500. In each of the blocks there is a representation of valve states 1505_a_-1505_g_ for each step, similar to that of FIG. 2. From left to right, there is a circle for the carbon dioxide-in line, the beer line, and the suction line, and then there is the regulated gas exit line and the fast gas exit line (see the positions of valves 204, 206, 208, 210, and 212 of FIG. 2). A "X" through a given circle means the valve for the corresponding line is closed. Thus, in step 1504, all five of the valves are closed in valve state 1505_a_. Step 1504 is a bottle placement step where all of the valves are closed, and a bottle is placed into the apparatus and engaged with the bottling head 102. To advance to step 1506, the cam wheels are advanced by rotating them one sector (e.g. sixty degrees) as indicted by arrow 1503. A stepper motor can be controlled to rotate the cam wheels. As mentioned, the drive force can be applied to an outside cam wheel (on the end of the series) and due to the cam wheels being interlocked, the drive force propagates through all of the cam wheels so that they all turn in unison. In step 1506, the cams of the first and fifth cam wheels have a relief that is moved into the valve control position (i.e. at the top). As a result, the valves for carbon dioxide, and the fast gas exit are opened in state 1505_b_. This step purges the bottle of oxygen by using carbon dioxide to displace air in the bottle. Once purged, then the cam wheels are again advanced by rotating them one more sector, as indicated by arrow 1507, to step 1508. In step 1508, the valve state 1505_c_ is that only the carbon dioxide line is open, and as a result of the bottle being sealed on the bottling head, the bottle is pressurized with carbon dioxide.

Once pressurized, the cam wheels are again advanced one rotational position, as indicated by arrow 1509, to step 1510 in which the bottle is filled. Valve state 1505_d_ indicates that the beer line and the gas slow exit line valves are open with the others being closed. While the bottle is filling with beer, carbon dioxide is allowed to exit through a pressure regulator that maintains the pressure in the bottle. Also, a sensor monitors the level of beer in the bottle, and when the beer reaches a preselected level, the cam wheels are advanced again by another sector of rotation, or rotational step, as indicated by arrow 1511, and the process 1500 moves to the de-pressurization step 1512. In the depressurization step, the valve state 1505_e_ indicates that only the gas fast exit valve is open. Once depressurized, then the cam wheels are advanced one sector of rotation as indicated by arrow 1513 to the remove step 1514. In the remove step 1514, the suction line valve is open as indicated in vale state 1505_f_, and the filled bottle can then be removed from the apparatus. At this point, one of two actions can happen; the process can advance to another bottle being filled, as indicated by line 1516, by again advancing the cam wheels by one sector as indicated by arrow 1523, which will return to step 1504. On the other hand, if the bottling session is complete, then the bottling apparatus needs to be cleaned.

To advance to the cleaning step 1520, path 1518 is followed by reversing the rotation of the cam wheels by one or more sectors of rotation, as indicated by arrow(s) 1515. Since some of the cam wheels are configured to rotate one or more sectors before engaging their adjacent cam wheel, using, for example, notch 1102 in the interior hub, the cam wheels are configured so that a relief of each cam is aligned at the same sector position, at the valve position, so that, as indicated by valve state 1505_g_, all of the valves are open. It should be understood that although the cleaning step 1520 is shown as occurring after the removal step 1514, it can also occur from step 1504, in which all of the valves are closed. In fact, it may be preferable to enter the cleaning step 1520 from the state of the placement step 1504 because, with all of the valves closed, the carbon dioxide and beer lines can be shut down to remove pressure from the lines of the bottling apparatus. That way, when the valves are opened for the cleaning step 1520, as indicated by valve state 1505_g_, carbon dioxide and beer aren't being expelled through the lines. Then the tubing for each line can be removed and cleaned for the next bottling operation. From the cleaning step, with the valves open, as indicated in valve state 1505_g_, the cam wheels can be advanced in the direction used for the bottling operations, as indicated by arrows 1521, 1523 until the valve state of 1505_a_ is reached in step 1504. Then, bottling operations may be resumed as previously described.

Figure 16:
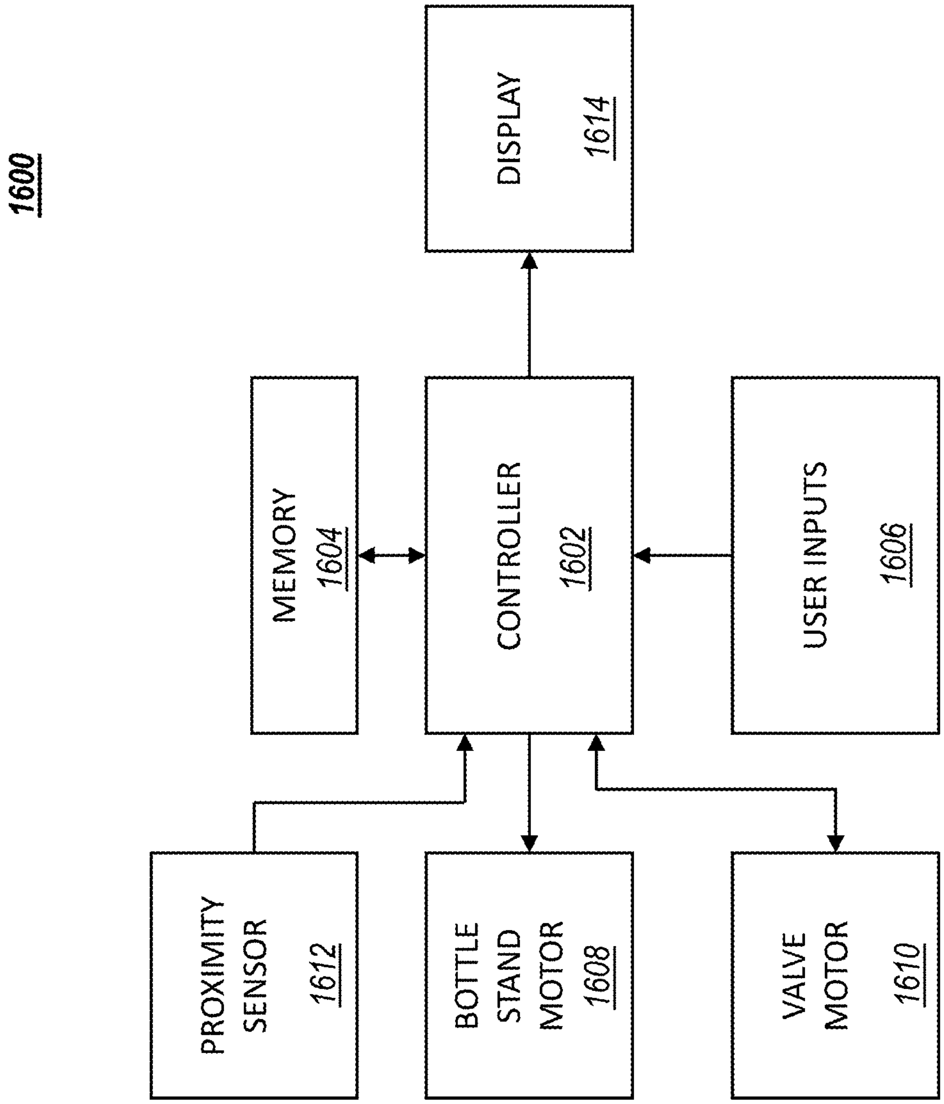
FIG. 16 is a system schematic diagram of a bottling apparatus including flow control, in accordance with some embodiments.

FIG. 16 is a system schematic diagram of a bottling apparatus 1600 including flow control, in accordance with some embodiments. The apparatus 1600 can include a controller 1602, such as a microcontroller or microprocessor, but can also be a programmable logic array. The controller 1602 is coupled to a memory 1604 that can include both non-volatile storage memory as well as operational addressable memory such as random-access memory. The memory 1604 can include instruction code for carrying out the operations for bottling, as previously described, in interacting with the other components described here. On or more user inputs 1606 can be included and coupled to the controller 1602, and can include one or more buttons or levels to provide input into the apparatus. For example, buttons can be used by an operator to manually advance the valve state for each step of the bottling operation. Alternatively, a button can be used to initiate an automatic process where the controller operates the system components through each of several bottling operations without the need for manual input. The controller 1602 is further coupled to a valve motor 1610 which can be used to control the valve state of the valve block by advancing the cam wheels as is appropriate. The controller can also be coupled to a bottle stand motor 1608, which controls operation of a platform on which a bottle is placed. Once triggered, the controller can cause the bottle stand motor to raise the bottle into engagement with the bottling head. A proximity sensor 1612 can be used to sense the level of beer in the bottle, and to shut off the beer flow when the beer level in a bottle being filled reaches a preselected level. A display 1614 may be used to indicates which step is being performed by the bottling apparatus 1600 at any given time. Other information can be displayed as well, such as how many bottle have been filled in the present bottling session.

Figure 17B:
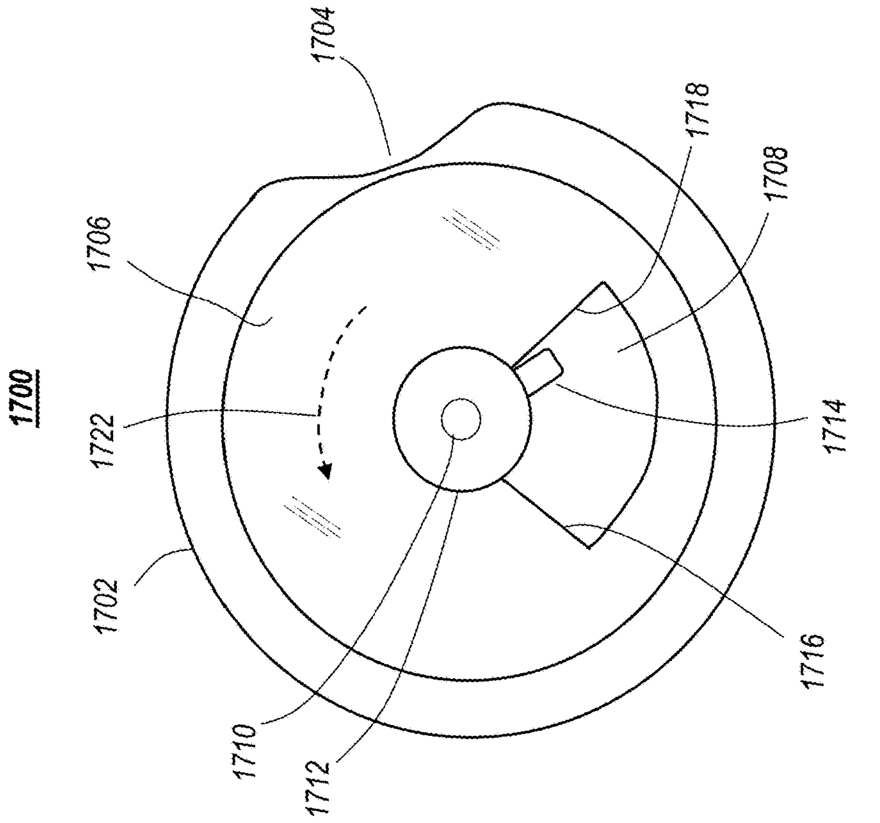
FIG. 17B is a side view of a cam wheel for a bottling valve assembly that allows the cam wheel to shift relief alignment with other cam wheels when the direction of rotation is reversed, and being driven in a second rotational direction, in accordance with some embodiments.
Figure 17A:
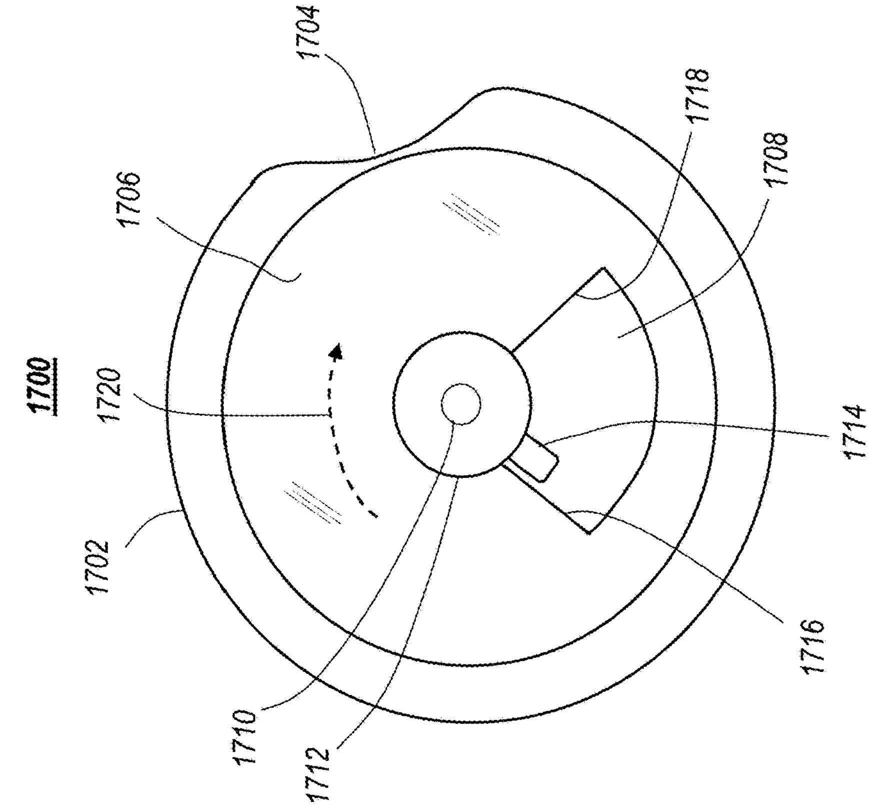
FIG. 17A is a side view of a cam wheel for a bottling valve assembly that allows the cam wheel to shift relief alignment with other cam wheels when the direction of rotation is reversed, and being driven in a first rotational direction, in accordance with some embodiments.
Figure 17C:
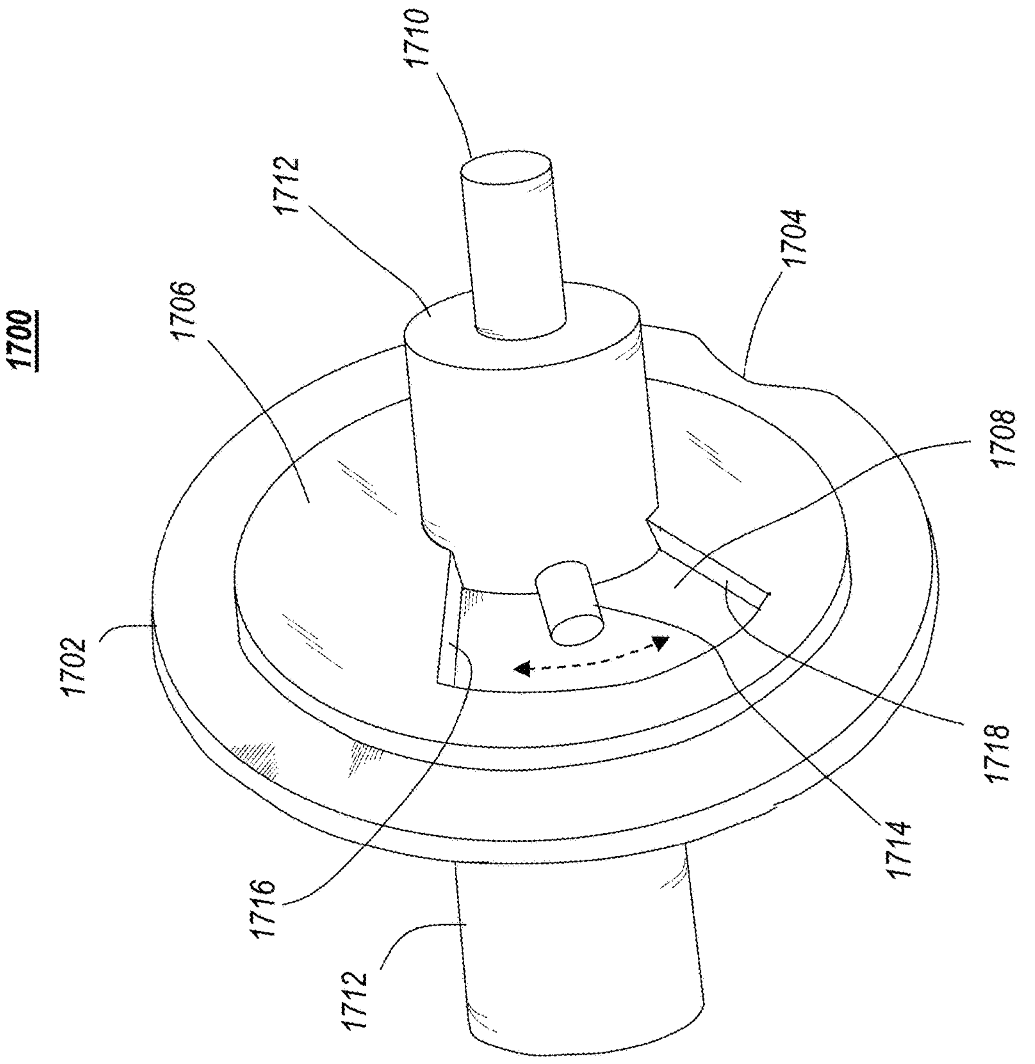
FIG. 17C is a side perspective view of a cam wheel for a bottling valve assembly that allows the cam wheel to shift relief alignment with other cam wheels when the direction of rotation is reversed, in accordance with some embodiments.

FIG. 17A is a side view of a cam wheel 1700 for a bottling valve assembly that allows the cam wheel 1700 to shift relief alignment with other cam wheels on a common axle when the direction of rotation is reversed, in accordance with some embodiments. In FIG. 17A the cam wheel 1700 is being driven in a first rotational direction, and FIG. 17B shows the cam wheel 1700 being driven in a second (reverse) rotational direction. FIG. 17C shows a side perspective view of the cam wheel 1700 to illustrate the features used for driving the cam wheel 1700 from the common axle. As indicted in FIGS. 13A & 13B, the rotational positioning of the reliefs of each cam wheel varies depending on which direction the cam wheels are being rotated. For the sake of clarity, rotating the cam wheels in a forward direction shall be understood to mean rotating the cam wheels about the common axis of the axle in the direction in which the cam wheels are rotated during the various steps of the bottling process, which allows the bottling process to be repeated through the bottling steps as described herein. Rotating the cam wheels in a reverse direction shall be understood to mean rotating them in the opposite direction about the common axis to that used for the bottling process. Rotating them in the reverse direction is used to commonly align a relief of each cam wheel so that when these commonly aligned reliefs are positioned in the valve block all of the valves will be open. This is used for servicing and cleaning the lines after a bottling session is otherwise complete. When rotated in the forward direction, the mechanical features of the various cam wheels is such that, when they are rotated in unison, each cam wheel has a relief located around the circumferential perimeter of the cam wheel assembly at an angle position corresponding to one of the steps of the bottling process where the cam wheel opens its respective valve. However, the cam wheels are not locked in place relative to each other, and at least one of the cam wheels is able to move independently for one or more step positions before the cam wheels again begin rotating in unison, allowing a relief of each cam wheel to be moved into a common step position so that all of the valves of the valve block can be opened at the same time when these commonly aligned reliefs are rotated into the valve block.

FIGS. 17A & 17B show a cam wheel 1700 from a side view, looking in a direction along the axis of the axle 1710 about which the cam wheel rotates. The cam wheel 1700 is moved by the rotation of the axle 1710, as will be explained. The cam wheel 1700 include a cam 1702 which is the outermost portion of the cam wheel in the radial direction from the axle 1710. In general, the cam 1702 has a generally circular circumference about the axle 1710, meaning a consistent radial distance from the axle 1710, except at one or more reliefs 1704 where the radial distance from the axle to the cam 1702 is reduced. The radial distance of the cam 1702 other than at the relief(s) 1704 is such that the cam maintains a respective valve in the valve block (e.g. 116) closed. However, when the relief 1704 is rotated into the valve block, the valve will open, allowing the fluid or gas through the respective tubing line to flow into or out of the bottle being filled, depending on the step of the bottling process to which the rotational position of the relief 1704 corresponds.

Referring generally to FIGS. 17A, 17B, and 17C, the cam wheel 1700 has hub portion 1706 which can be generally circular about the axle 1710, and which extends, in a direction of the axle 1710 a height from the planar cam portion of the cam 1702. There is a recess or cavity 1708 formed into the hub portion 1706. The cavity 1708 extends from the axle cover 1712 outward, radially, and has an angular width of at least one rotational position. The opening through the cam wheel, which the axle 1710 and axle cover 1712 pass, can have a diameter that is just slightly larger than the axle/axle cover to allow the cam wheel to freely rotate about the axle/axle cover. To move the cam wheel, a drive pin 1714 operates as a drive member and extends through or from the axle cover 1712 into the cavity 1708. When the axle 1710 is rotated, the drive pin 1714 moves with the axle 1710, and will either bear against radial wall 1716 or radial wall 1718 of the cavity 1708, depending on the direction of rotation. For example, in FIG. 17A the axle is rotated in the direction of arrow 1720, causing the drive pin 1714 to bear against radial wall 1716 of the cavity 1708. This makes the cam wheel rotate with the axle 1710 as it rotates. The axle 1710 can be driven by a stepper motor to turn in discrete rotational steps. In FIG. 17B, when the direction of rotation is reversed from that of FIG. 17A, as indicated by arrow 1722, the drive pin 1714 bears against radial wall 1718, moving the cam wheel in correspondence with the axle 1710. However, when the direction of rotation is reversed, the cam wheel does not rotate for at least one rotational step in which the drive pin 1714 is repositioned from one side of the cavity 1708, bearing against one radial wall, to the opposite side of the cavity 1708, to bear against the opposite radial wall. This means that the cavity 1708 must have an arc length of one rotational step plus the width of the drive pin 1714. If the cam wheel 1700 is to remain unrotated for more than one rotational step when the direction of rotation is reversed, then the arc width of the cavity will be two or more discrete rotational steps plus the width of the drive pin 1714. Thus, for example, if the cam wheel is to remain unrotated for the first two rotational steps where each rotational step is sixty degrees of rotation, then the cavity 1708 will have an arc width of one hundred twenty degrees, plus the width of the drive pin 1714. That is, the arc distance around the axis of rotation from the radial wall 1716 to radial wall 1718 is one or more discrete rotational steps, plus the width of the drive pin 1714. Given that there are multiple cam wheels, one for each valve in the valve block, more than one of the cam wheels can have cavity that spans at least one rotational step arc width. The one or more cam wheels that have a cavity like that shown here, or larger, will remain unrotated for one or rotational steps of the axle rotation. Any cam wheel that is not meant to be unrotated for at least one rotational step when the direction of rotation is reversed will be locked to the axle by having a cavity that is only as wide as the drive pin used to turn that cam wheel. By arranging the cam wheels in a selected order for the various valves across the valve block and by arranging the arc width of the cavity in each cam wheel, the cam wheels can having their respective relief(s) arranged in an order corresponding to the successive bottling steps so that each relief is rotated into the valve block for the corresponding step when the respective valve is to be opened while the axle and cam wheels are rotated in the forward direction for bottling operations, as in FIG. 13A. Then, when the bottling operations are complete for the bottling session, the axle rotation is reversed, moving some, but not all of the cam wheels initially, for at one rotational step, until a relief of each cam wheel is oriented at a common position, as in FIG. 13B, and then these commonly aligned reliefs are rotated into the valve block to simultaneously open all of the valves. Once the reliefs are aligned across the plurality of cam wheels, then all of the cam wheels will again rotate in unison.

The disclosed bottling flow apparatus provides control over a bottling process in which there are sequential steps through which various lines are opened to allow the flow of gasses and fluid content into, and out of a bottle being filled. The inventive cam wheel assembly controls each successive step of the series of steps in the bottling process as they are rotated in unison together in the forward direction. Each cam wheel has one or more reliefs that allow the respective valve to open when the relief is rotated into the valve block. Upon completion of the bottling process, the apparatus must be cleaned and washed. To facilitate cleaning, it is desirable to open all of the valves at once, to allow either removal of the tubing lines for washing, and/or flushing of the tubing lines while they are still in the valve block. This avoids, for example, manually turning the cam wheels to open or two valves are a time and clean them each separately. When rotated in the forward direction, when the cam wheels rotate in unison, there is no rotational position where all of the valves are opened at the same time. Thus, to get all of the valves to open at the same time for cleaning/maintenance of the apparatus, one or more of the cam wheels will not rotate, initially, for one or more rotational positions when the direction of rotation is reversed, relative to the other cam wheels that are locked to the axle and always rotate with the axle. By selecting the number of positions, and the cam wheels, that do nit initially rotate, reliefs on all of the cam wheel can be aligned at one rotational position, and thereafter the cam wheel will again rotate in unison so that the operator can rotate the aligned reliefs into the valve block, thereby opening all of the valves at the same time. When the cam wheels are then again rotated in the forward direction, the same cam wheel or cam wheels that did not rotate initially when the rotation was reversed will again remain unrotated for one or more rotational positions, which will re-align the reliefs of the cam wheels for the sequential steps of the bottling process.

The claims appended hereto are meant to cover all modifications and changes within the scope and spirit of the present invention.

What is claimed is:

1. A bottling flow control apparatus, comprising:

a valve block having a plurality of valves, each valve of the plurality of valves configured to selectively close and open a respective tubing line of a plurality of tubing lines through the valve block;

a plurality of cam wheels, each cam wheel being aligned with a respective one valve of the plurality of valves, each cam wheel of the plurality of cam wheels having a circumferential cam having at least one relief, wherein the plurality of cam wheels are rotatable about a common axle that is aligned with the plurality of valves, wherein when each cam wheel is rotated about the common axis, the circumferential cam maintains the respective valve aligned with each cam wheel closed until the at least one relief is rotated into the valve block;

wherein the plurality of cam wheels are rotated in a forward direction through a series of rotational positions, each one of the rotational positions corresponding to a sequential step of a plurality of sequential steps of a bottling process in which different ones of the plurality of valves are opened for each sequential step of the bottling process, and wherein when being rotated in the forward direction during the bottling process all of the cam wheels rotate in unison; and wherein when the common axle is rotated in a reverse direction at least one of the plurality of cam wheels does not rotate for at least one rotational position, and wherein after the common axle is rotates in the reverse direction the at least one rotational position the at least one relief of each cam wheel will be aligned to produce a plurality of aligned reliefs and the plurality of cam wheels then rotate in unison such that when the plurality of aligned reliefs are rotated into the valve block all of valves of the plurality of valve are opened.

2. The bottling flow control apparatus of claim 1, wherein the plurality of cam wheels are driven by a stepper motor that is operable to rotate the plurality of cam wheels in increments of rotation equal to the rotational positions.

3. The bottling flow control apparatus of claim 1, wherein each cam wheel of the plurality of cam wheels includes a hub having a cavity in which a drive member is disposed to impart rotation to the cam wheel.

4. The bottling flow control apparatus of claim 3, wherein the at least one of the plurality of cam wheels that does not rotate for at least one rotational position when the common axle is rotated in the reverse direction comprises a cavity in its hub that has an arc width of at least one rotational position to allow a drive pin attached to the axle to move the at least one rotational position before imparting rotational force to the cam wheel when rotation of the axle is reversed.

5. The bottling flow control apparatus of claim 1, wherein each valve of the plurality of valves comprises a valve shaft, wherein the circumferential cam of the respective cam wheel corresponding to each valve bears a distal end of the valve shaft.

6. The bottling flow control apparatus of claim 1, wherein the plurality of tubing lines comprises five tubing lines for, respectively, a carbon dioxide tubing line, a fluid content tubing line, a suction tubing line, a pressurized fill tubing line, and a depressurization tubing line.

7. A cam wheel assembly for actuating valves of a bottling flow control apparatus, comprising:

a plurality of cam wheels arranged on a common axle, wherein the plurality of cam wheels are rotated in unison about the common axle in a forward direction through a series of rotational positions which correspond to an equal number of steps of a bottling process;

each cam wheel of the plurality of cam wheels including a circumferential cam having at least one relief and a hub having a cavity configured to receive a drive member therein that imparts rotational force to the cam wheel;

wherein, in at least one cam wheel of the plurality of cam wheels the cavity has an arc width that is equal to at least one rotational position which allows the respective drive member disposed in the cavity to move the at least one rotational position when rotational direction of the common axle is reversed before imparting rotational force to the at least one cam wheel having the cavity that has an arc width that is equal to at least one rotational position; and wherein, when the axle is rotated in a reverse direction the at least one cam wheel in which the cavity has an arc width that is equal to at least one rotational position does not rotate for at least one rotational position and wherein the at least one relief of each cam wheel align on a common rotational position thereby enabling all of the valves to open together.

8. The cam wheel assembly of claim 7, wherein the cam wheel assembly includes a first cam wheel for actuating a valve for a carbon dioxide tubing line, a second cam wheel for actuating a valve for a fluid content tubing line, a third cam wheel for actuating a valve for a suction tubing line, a fourth cam wheel for actuating a valve for a pressurized fill tubing line, and a fifth cam wheel for actuating a valve for a depressurization tubing line.

9. The cam wheel assembly of claim 8, wherein:

the at least one relief of the circumferential cam of the first cam wheel comprises a first relief for a purge step of the bottling process in which carbon dioxide is used to purge air from a bottle, and a second relief for a pressurization step of the bottling process in which the bottle is pressurized with carbon dioxide;

the at least one relief of the circumferential cam of the second cam wheel comprises a first relief for a fill step of the bottling process in which the bottle is filled;

the at least one relief of the circumferential cam of the third cam wheel comprises a relief for a removal step of the bottling process in which the bottle is removed from the bottling flow control apparatus;

the at least one relief of the circumferential cam of the fourth cam wheel comprises a relief for the fill step of the bottling process to allow carbon dioxide to leave the bottle under pressure as the bottle is filled with fluid content; and the at least one relief of the circumferential cam of the fifth cam wheel comprises a first relief for the purge step and a second relief for a depressurization step of the bottling process.

10. The cam wheel assembly of claim 7, wherein, in at least one cam wheel of the plurality of cam wheels, the cavity is sized to fit the drive member such that the at least one cam wheel is locked to the common axle and always rotates with the common axle regardless of rotational direction.

11. The cam wheel assembly of claim 7, wherein the drive member in each cam wheel extends from the common axle.

12. The cam wheel assembly of claim 7, wherein the circumferential cam of at least one cam wheel of the plurality of cam wheels comprises at least two reliefs.

13. A method of operating a cam wheel assembly of a bottling flow control apparatus in which each cam wheel selectively opens a respective valve of a plurality of valves in a valve block, a plurality of cam wheels being provided on a common axle, the method comprising:

rotating the plurality of cam wheels about the common axle in a forward direction, during a bottling process, through consecutive rotational positions, where each rotational position corresponds to a sequential step of a plurality of steps of a bottling process where ones of the plurality of cam wheels selectively open one or more of the plurality of valves to perform a step of the bottling process, and wherein the plurality of cam wheels are rotated in unison for each sequential step of the plurality of steps, and wherein the plurality of steps are repeated with each full rotation of the plurality of cam wheels;

wherein, during the bottling process all of the valves of the plurality of valves are never opened together at a same time through each full rotation of the cam wheels; and upon completing a bottling process in which at least one bottle is filled using the plurality of steps, rotating the common axle in a reverse direction through a plurality of rotational positions in which, for at least a first rotational position, at least one cam wheel of the plurality of cam wheels does not rotate initially with at least one other cam wheel of the plurality of cam wheels, and wherein, upon further rotation in the reverse direction, the plurality of cam wheels rotate in unison, and wherein for at least one rotational position in the reverse direction as the plurality of cam wheels are rotated in unison in the reverse direction, all of the valves are opened at the same time.

14. The method of claim 13, wherein rotating the cam wheels in the forward direction through consecutive rotational positions corresponding to consecutive steps of the bottling process comprises:

rotating the plurality of cam wheels into a first rotational position to allow placement of a bottle in the bottling apparatus;

next rotating the plurality of cam wheels to a second rotational position, that is successive to the first rotational position, to purge the bottle of air using carbon dioxide;

next rotating the plurality of cam wheels to a third rotational position, that is successive to the second rotational position, to pressurize the bottle with carbon dioxide;

next rotating the plurality of cam wheels to a fourth rotational position, that is successive to the third rotational position, to fill the bottle with fluid content under pressure;

next rotating the plurality of cam wheels to a fifth rotational position, that is successive to the fourth rotational position, to depressurize the bottle; and next rotating the plurality of cam wheels to a sixth rotational position, that is successive to the fifth rotational position, to apply suction to a fill tube that is placed into the bottle during the bottling process as the bottle is removed from the bottling flow control apparatus.

15. The method of claim 13, wherein when rotating in the reverse direction, the at least one cam wheel of the plurality of cam wheels does not rotate initially with at least one other cam wheel of the plurality of cam wheels by allowing a drive member connected to the common axle to move freely within a cavity of the at least one cam wheel.

16. The method of claim 13, wherein, subsequent to rotating the cam wheels in the reverse direction, rotating the cam wheels in the forward direction, wherein the same at least one cam wheel of the plurality of cam wheels that did not rotate initially with at least one other cam wheel of the plurality of cam wheels when the common axle was rotated in the reverse direction does not initially rotate in the forward direction for at least one rotational position of rotation of the common axle, wherein the cam wheels are thereafter aligned to perform the sequential steps of the bottling process.

* * * * *